(12) United States Patent  
Oochi et al.

(10) Patent No.: US 9,005,002 B2  
(45) Date of Patent: Apr. 14, 2015

(54) CONTENT GIVING CONTROL METHOD

(71) Applicant: NAMCO BANDAI Games Inc., Shinagawa-ku, Tokyo (JP)

(72) Inventors: Hiroaki Oochi, Tokyo (JP); Yousuke Futami, Tokyo (JP)

(73) Assignee: BANDAI NAMCO Games Inc., Tokyo (JP)

( * ) Notice: Subject to any disclaimer, the term of this patent is extended or adjusted under 35 U.S.C. 154(b) by 83 days.

(21) Appl. No.: 13/745,895

(22) Filed: Jan. 21, 2013

(65) Prior Publication Data

US 2013/0196732 A1  Aug. 1, 2013

(30) Foreign Application Priority Data

Jan. 27, 2012  (JP) ................. 2012-015437

(51) Int. Cl.  
*A63F 9/24* (2006.01)  
*A63F 13/00* (2014.01)

(52) U.S. Cl.  
CPC .. *A63F 9/24* (2013.01); *A63F 13/00* (2013.01)

(58) Field of Classification Search  
USPC ............. 463/16–20, 29–31, 1, 40–43  
See application file for complete search history.

(56) References Cited

U.S. PATENT DOCUMENTS

| | | | |
|---|---|---|---|
| 6,203,430 B1* | 3/2001 | Walker et al. | 463/20 |
| 2006/0068872 A1* | 3/2006 | Walker et al. | 463/13 |
| 2007/0032287 A1* | 2/2007 | Osawa | 463/16 |
| 2008/0200244 A1* | 8/2008 | Rowe et al. | 463/27 |
| 2009/0117970 A1* | 5/2009 | De Waal et al. | 463/20 |
| 2009/0258694 A1* | 10/2009 | Kim | 463/20 |
| 2011/0165940 A1 | 7/2011 | Kira et al. | |
| 2013/0095917 A1* | 4/2013 | Jaffe et al. | 463/26 |

FOREIGN PATENT DOCUMENTS

| | | | |
|---|---|---|---|
| JP | 2002-366852 A | 12/2002 | |
| JP | 2008-253521 A | 10/2008 | |
| JP | 2011-139792 A | 7/2011 | |

OTHER PUBLICATIONS

Sengoku Basara 2, Heroes, authorized guidebook, Takero Sakamoto, et al., Capcom Co., Ltd., Jan. 4, 2008, first edition, pp. 4-9, 19-30 (with partial English translation).

Soul Calibur IV, Negi, Weekly Famitsu, Enterbrain Inc., Sep. 12, 2008, vol. 23, No. 37, pp. 58-61 (with partial English translation).

Puella Magi Madoka Magica, Appli-STYLE, Koiunreki, January extra edition, East Press Co., Ltd., Jan. 15, 2012, vol. 6, pp. 44-45 (with partial English translation).

* cited by examiner

*Primary Examiner* — Milap Shah  
(74) *Attorney, Agent, or Firm* — Posz Law Group, PLC

(57) ABSTRACT

A given content list stores information about a content that has been given to a player. When a prize content selected by a lottery has been registered in the given content list, it is determined that the prize content satisfies a duplication condition, and an alternative content is selected from an alternative content list, and given to the player instead of the prize content selected by the lottery. An alternative content notification screen that notifies the player that the alternative content has been given to the player is displayed.

17 Claims, 14 Drawing Sheets

PRIZE CONTENT LIST

| PRIZE CONTENT ID (511) | CONTENT DATA (512) | SELECTION CONDITION (513) | WIN PROBA- BILITY (514) | DUPLICATION UPPER LIMIT (515) |
|---|---|---|---|---|
| CNT001 | ITEM A | ALWAYS | 2.5% | 1 |
| CNT002 | ITEM B | ALWAYS | 5.0% | 1 |
| ⋮ | ⋮ | ⋮ | ⋮ | ⋮ |
| CNT033 | ITEM D | CUMULATIVE PLAY TIME> 50 HOURS | 2.5% | 2 |
| CNT034 | RARE ITEM E | 7 DAYS ELAPSED AFTER START OF GAME PLAY | 2.5% | 2 |
| CNT035 | EXPERIENCE VALUE | ALWAYS | 0.3% | 1 |
| ⋮ | ⋮ | ⋮ | ⋮ | ⋮ |
| CNT056 | MOVIE DATA P | JANUARY 1 TO 3 | 0.2% | 1 |
| CNT057 | EVENT EXECUTION DATA Q | FEBRUARY 14 | 100% | 1 |
| ⋮ | ⋮ | ⋮ | ⋮ | ⋮ |

ALTERNATIVE CONTENT LIST

| ALTERNATIVE CONTENT ID (521) | CONTENT DATA (522) | SELECTION CONDITION (523) | POSSESSION COUNT UPPER LIMIT (524) |
|---|---|---|---|
| CNT101 | CURRENCY MEDIUM (5 CHARINS) | ALWAYS | 1000 |
| CNT102 | ITEM J | ALTERNATING COUNT≥5 | 2 |
| CON103 | DEFENSE CAPABILITY: +2 TO +10 | ALWAYS | NO |
| CON104 | CHRISTMAS EVENT DATA | DECEMBER 20 TO 25 | 1 |
| CON105 | LOTTERY TICKET | ALWAYS | 20 |
| CON106 | WINTER CLOTHES | JANUARY TO FEBRUARY, AND ALTERNATING COUNT≥10 | 1 |
| CON107 | ORGANIC COTTON BATHING SUIT | DUPLICATION OF RARE ITEM E | 1 |
| CNT108 | CURRENCY MEDIUM (10 TO 20 CHARINS) | DUPLICATION OF RARE ITEM F | 1000 |
| ⋮ | ⋮ | ⋮ | ⋮ |

FIG. 7

GIVEN CONTENT LIST 540

| CONTENT ID 541 | CONTENT DATA 542 | POSSES-SION COUNT 543 | ALTER-NATING COUNT 544 | GIVING DATE/TIME 545 |
|---|---|---|---|---|
| CNT101 | CURRENCY MEDIUM | 89 | 5 | 2011/1/2/10:30, ⋯ |
| CNT003 | ITEM C | 1 | 0 | 2010/12/20/8:34 |
| CNT033 | ITEM D | 1 | 0 | 2010/12/22/19:02 |
| ⋮ | ⋮ | ⋮ | ⋮ | ⋮ |

CONTENT GIVING CONTROL METHOD

Japanese Patent Application No. 2012-015437 filed on Jan. 27, 2012, is hereby incorporated by reference in its entirety.

BACKGROUND

A video game that gives a content selected by a lottery to the player has been known (see JP-A-2002-366852, for example).

A content selected by a lottery is normally given to the player as a service that is provided by an online game, or a service that is provided by a social networking service, for example. In recent years, a service that randomly selects and provides a content by a lottery has become popular, and the main game or the main service may be evaluated based on such a service.

SUMMARY

According to one aspect of the invention, there is provided a method for controlling giving of a content that is usable on a computer, the method comprising:

causing the computer to select a content from a plurality of contents by a lottery;

causing the computer to determine whether or not to give the selected content based on whether or not the selected content and a given content satisfy a duplication condition; and causing the computer to give the selected content when it has been determined to give the selected content, and give an alternative content when it has been determined not to give the selected content.

According to another aspect of the invention, there is provided a non-transitory computer-readable storage medium storing a program that causes a computer to control giving of a content that is usable on the computer, the program causing the computer to:

select a content from a plurality of contents by a lottery;

determine whether or not to give the selected content based on whether or not the selected content and a given content satisfy a duplication condition; and give the selected content when it has been determined to give the selected content, and give an alternative content when it has been determined not to give the selected content.

According to another aspect of the invention, there is provided a game device comprising:

a selection section that selects a content from a plurality of contents by a lottery;

a determination section that determines whether or not to give the content selected by the selection section based on whether or not the content selected by the selection section and a given content satisfy a duplication condition; and a content-giving section that gives the content selected by the selection section when the determination section has determined to give the content selected by the selection section, and gives an alternative content when the determination section has determined not to give the content selected by the selection section.

According to another aspect of the invention, there is provided a server system that selects a content based on a selection request signal from a player terminal that is connected to the server system via communication and is operated by a player, and gives the selected content to the player, the server system comprising:

a selection section that selects a content that is given to the player from a plurality of contents by a lottery corresponding to the selection request signal;

a determination section that determines whether or not to give the content selected by the selection section to the player based on whether or not the content selected by the selection section and a content that has been given to the player satisfy a duplication condition; and a content-giving section that transmits data of the content selected by the selection section to the player terminal when the determination section has determined to give the content selected by the selection section to the player, and transmits data of an alternative content to the player terminal when the determination section has determined not to give the content selected by the selection section to the player.

According to another aspect of the invention, there is provided a server system that selects a content based on a selection request signal from a player terminal that is connected to the server system via communication and is operated by a player, and gives the selected content to the player, the server system comprising:

a group management section that manages linking between a group and a player who belongs to the group;

a selection section that selects a content that is given to the player from a plurality of contents by a lottery corresponding to the selection request signal;

a determination section that determines whether or not to give the content selected by the selection section to the player based on whether or not the content selected by the selection section and a content that has been given to the player satisfy a duplication condition; and a content-giving section that transmits data of the content selected by the selection section to the player terminal when the determination section has determined to give the content selected by the selection section to the player, and transmits data of an alternative content to the player terminal when the determination section has determined not to give the content selected by the selection section to the player.

BRIEF DESCRIPTION OF THE DRAWINGS

FIG. 5 is a view illustrating an example of the data configuration of a prize content list.

FIG. 6 is a view illustrating an example of the data configuration of an alternative content list.

FIG. 7 is a view illustrating an example of the data configuration of a given content list.

DESCRIPTION OF EXEMPLARY EMBODIMENTS

Figure 1:
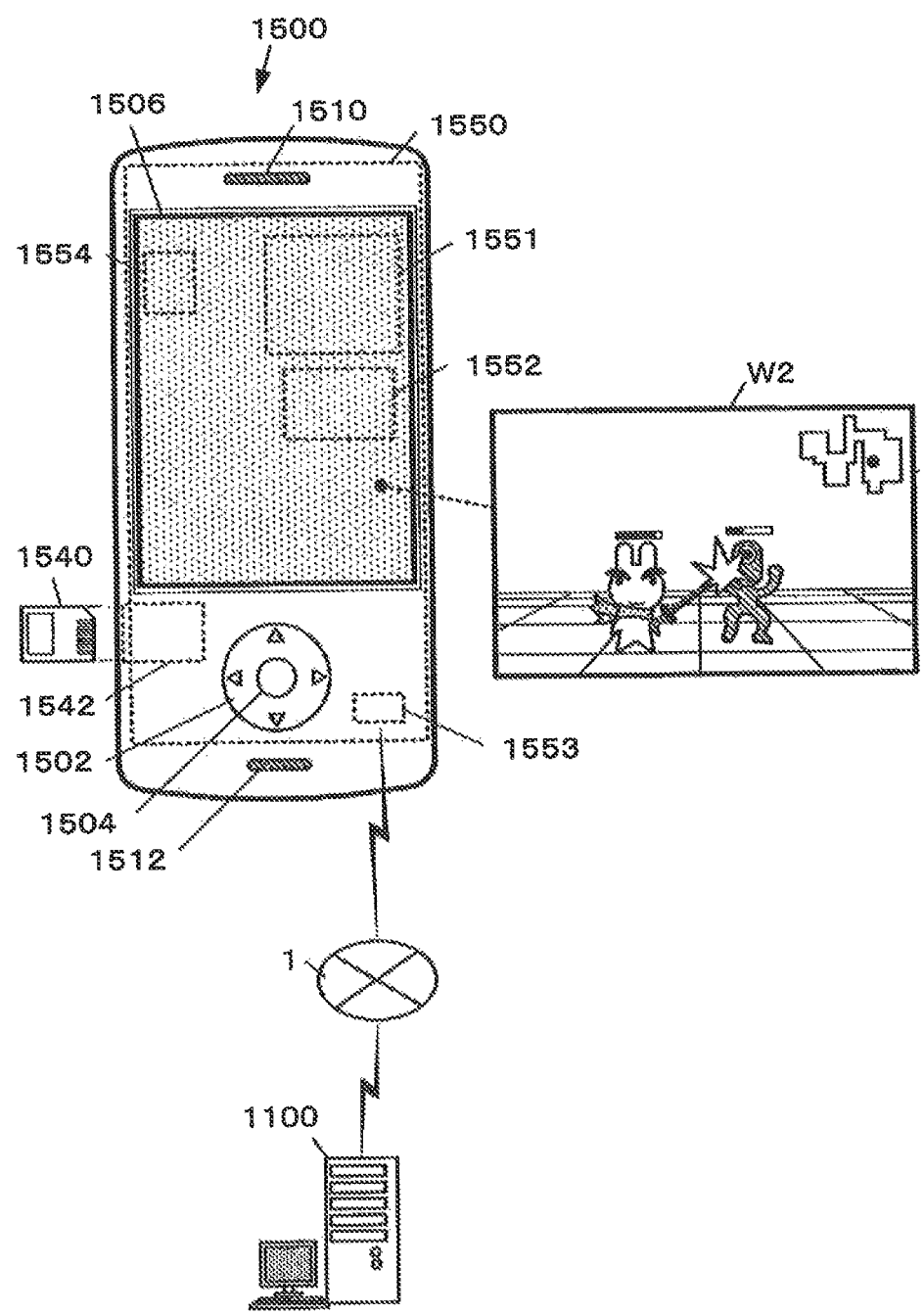
FIG. 1 is a front external view illustrating a configuration example of a game device according to a first embodiment.

Several embodiments of the invention may implement a novel interesting process that selects a content given to the player.

According to one embodiment of the invention, there is provided a method for controlling giving of a content that is usable on a computer, the method comprising:

causing the computer to select a content from a plurality of contents by a lottery;

causing the computer to determine whether or not to give the selected content based on whether or not the selected content and a given content satisfy a duplication condition; and causing the computer to give the selected content when it has been determined to give the selected content, and give an alternative content when it has been determined not to give the selected content.

According to another embodiment of the invention, there is provided a non-transitory computer-readable storage medium storing a program that causes a computer to control giving of a content that is usable on the computer, the program causing the computer to:

select a content from a plurality of contents by a lottery;

determine whether or not to give the selected content based on whether or not the selected content and a given content satisfy a duplication condition; and give the selected content when it has been determined to give the selected content, and give an alternative content when it has been determined not to give the selected content.

According to another embodiment of the invention, there is provided a game device comprising:

a selection section that selects a content from a plurality of contents by a lottery;

a determination section that determines whether or not to give the content selected by the selection section based on whether or not the content selected by the selection section and a given content satisfy a duplication condition; and a content-giving section that gives the content selected by the selection section when the determination section has determined to give the content selected by the selection section, and gives an alternative content when the determination section has determined not to give the content selected by the selection section.

According to another embodiment of the invention, there is provided a server system that selects a content based on a selection request signal from a player terminal that is connected to the server system via communication and is operated by a player, and gives the selected content to the player, the server system comprising:

a selection section that selects a content that is given to the player from a plurality of contents by a lottery corresponding to the selection request signal;

a determination section that determines whether or not to give the content selected by the selection section to the player based on whether or not the content selected by the selection section and a content that has been given to the player satisfy a duplication condition; and a content-giving section that transmits data of the content selected by the selection section to the player terminal when the determination section has determined to give the content selected by the selection section to the player, and transmits data of an alternative content to the player terminal when the determination section has determined not to give the content selected by the selection section to the player.

According to the above configuration, it is possible to determine the content that has been given to the player. The selected content is given to the player when the duplication condition is not satisfied, and the alternative content is given to the player when the duplication condition is satisfied. This makes it possible to prevent a situation in which an identical content is given to the player by a lottery.

The server system may further comprise:

a group management section that manages linking between a group and a player who belongs to the group, the content-giving section may select a content that has not been given to another player who belongs to a same group as the player as the alternative content when the determination section has determined not to give the content selected by the selection section to the player, and may give the selected content to the player.

According to another embodiment of the invention, there is provided a server system that selects a content based on a selection request signal from a player terminal that is connected to the server system via communication and is operated by a player, and gives the selected content to the player, the server system comprising:

a group management section that manages linking between a group and a player who belongs to the group;

a selection section that selects a content that is given to the player from a plurality of contents by a lottery corresponding to the selection request signal;

a determination section that determines whether or not to give the content selected by the selection section to the player based on whether or not the content selected by the selection section and a content that has been given to the player satisfy a duplication condition; and a content-giving section that transmits data of the content selected by the selection section to the player terminal when the determination section has determined to give the content selected by the selection section to the player, and transmits data of an alternative content to the player terminal when the determination section has determined not to give the content selected by the selection section to the player.

This makes it possible to determine whether or not the duplication condition is satisfied on a group basis.

The method may further comprising:

causing the computer to change the alternative content based on a number of times that it has been determined that the duplication condition is satisfied.

This makes it possible to change the alternative content corresponding to the number of times that it has been determined that the duplication condition is satisfied i.e., the number of times that the alternative content has been given to the player).

The method may further comprise:

causing the computer to consume a consumption parameter by a given consumption amount in exchange for execution of a process from the lottery to the giving of the selected content or the alternative content; and causing the computer to prevent execution of the lottery when the consumption parameter is less than the given consumption amount.

This makes it possible to require the player to pay for the content.

In the method, the giving of the alternative content may include giving the consumption parameter having a given value as the alternative content.

This makes it possible to give the consumption parameter to the player as the alternative content. A pseudo-currency, a virtual currency, or the like that can be used in the game or another service may be used as the consumption parameter.

The method may further comprise:

causing the computer to notify that the consumption parameter has reached an upper limit before executing the lottery when the consumption parameter has reached the upper limit.

This makes it possible to detect a state in which the consumption parameter cannot be stored any more, and notify the player to that effect before selection.

The method may further comprise:

causing the computer to notify that all of the plurality of contents that may be selected by the lottery have been given before executing the lottery when all of the plurality of contents that may be selected by the lottery have been given, and receive an operation that indicates whether or not to play the lottery; and causing the computer to prevent execution of the lottery when the operation indicates not to play the lottery.

This makes it possible to notify the player that all of the contents that can be given to the player by a lottery have been given to the player before executing a lottery. It is possible to prevent execution of a lottery when the player has performed an operation that cancels execution of a lottery after notification. Specifically, it is possible to notify the player that the lottery is disadvantageous for the player before executing a lottery. The player can cancel execution of a lottery when the player desires to cancel execution of a lottery.

In the method, the giving of the alternative content may include giving an image as the alternative content.

This makes it possible to give an image to the player as the alternative content. The image may be a still image or a movie (moving image).

In the method, the giving of the alternative content may include giving a parameter value that can be added to a game parameter as the alternative content.

This makes it possible to give a means that increases or decreases the game parameter to the player as the alternative content.

The method may further comprise:

causing the computer to give a content selected by the lottery within a period other than a given period, and give a content selected based on whether or not the duplication condition is satisfied within the given period.

This makes it possible to add a period element when determining whether or not to give the alternative content to the player, and provide versatility to the alternative content-giving method.

Exemplary embodiments of the invention are described in detail below. Note that the following exemplary embodiments do not in any way limit the scope of the invention defined by the claims laid out herein. Note also that all of the elements described in connection with the following exemplary embodiments should not necessarily be taken as essential elements of the invention.

First Embodiment

A first embodiment to which the invention is applied illustrates an example in which a game device executes a video game that allows the player to play a role-playing game (RPG) as a main game, and also enjoy a lottery that randomly selects a prize content (i.e., a content that is usable in the main game) as a subgame.

FIG. 1 is a front external view illustrating a configuration example of a game device according to the first embodiment.

A game device 1500 illustrated in FIG. 1 is a computer (electronic device) that is provided for each player. In the example illustrated in FIG. 1, the game device 1500 has a configuration similar to that of a smartphone. Note that the game device 1500 may be a portable game device, a stationary consumer game device, an arcade game device, a personal computer, a tablet computer, or the like. The game device 1500 can connect to a communication line 1, and access an external server system 1100. The communication line 1 is a communication channel that enables data communication. Specifically, the communication line 1 includes a communication network such as a local area network (LAN) using a private line (private cable) for direct connection, Ethernet (registered trademark), and the like, a telecommunication network, a cable network, and the Internet. The communication method may be a cable communication method or a wireless communication method.

The game device 1500 includes an arrow key 1502, a home key 1504, a touch panel 1506 that functions as an image display device and a touch position input device, a speaker 1510, a microphone 1512, a control board 1550, and a memory card reader 1542 that reads and writes data from and into a memory card 1540 (i.e., computer-readable information storage medium). The game device 1500 also includes a built-in battery, a power button, a volume control button, and the like (not illustrated in FIG. 1).

The control board 1550 includes a microprocessor (e.g., central processing unit (CPU) 1551, graphics processing unit (GPU), and digital signal processor (DSP)), an application-specific integrated circuit (ASIC), and an IC memory 1552 (volatile/nonvolatile memory) (e.g., VRAM, RAM, and ROM).

The control board 1550 also includes a communication device 1553 for connecting to the communication line 1, an interface (I/F) circuit 1554 such as a driver circuit that drives the touch panel 1506, a circuit that receives signals from the arrow key 1502 and the home key 1504, an output amplifier circuit that outputs a sound signal to the speaker 1510, an input signal generation circuit that generates a signal of voice collected by the microphone 1512, and a signal input-output circuit that inputs and outputs a signal to and from the memory card reader 1542, and the like. The elements included in (mounted on) the control board 1550 are electrically connected via a bus circuit or the like so that the elements can exchange data and a signal.

The control board 1550 executes a game program 504 (see FIG. 4) stored in an information storage medium (e.g., IC memory 1552 or memory card 1540), and controls each section of the game device 1500 corresponding to an operation input performed by the player using the arrow key 1502, the home key 1504, and the touch panel 1506 while referring to various types of data to implement a video game that includes a prize content lottery element. The player enjoys the game while watching a game screen W2 displayed on the touch panel 1506. Note that the game device 1500 may connect to the communication line 1 via the communication device 1553, and download a necessary program and data from an external device. The game screen W2 illustrates an example of a role-playing game (RPG). Note that the game is not limited to an RPG.

Principle

Figure 2:
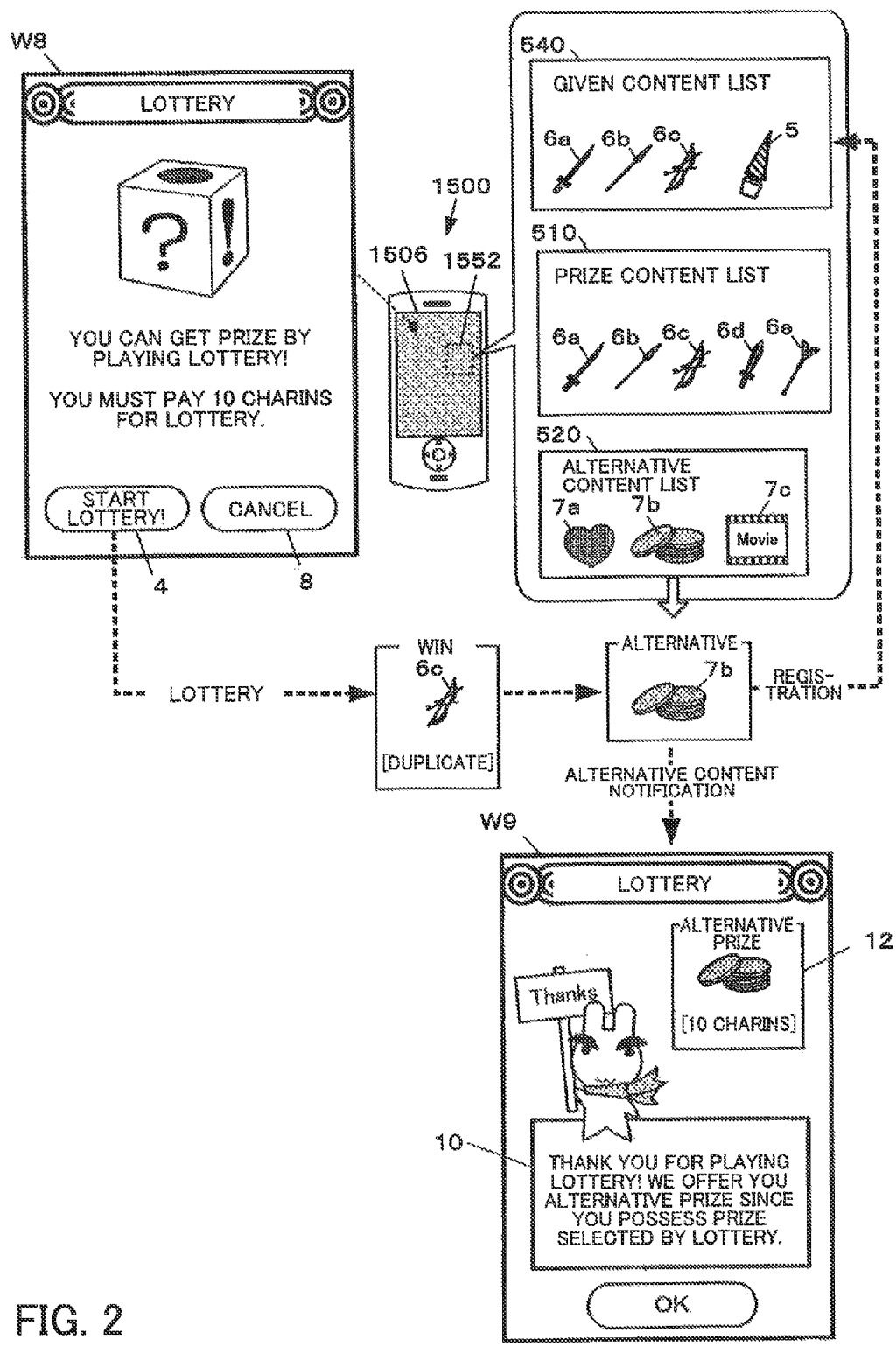
FIG. 2 is a view illustrating the concept of a prize content lottery (i.e., subgame) according to the first embodiment.
Figure 3:
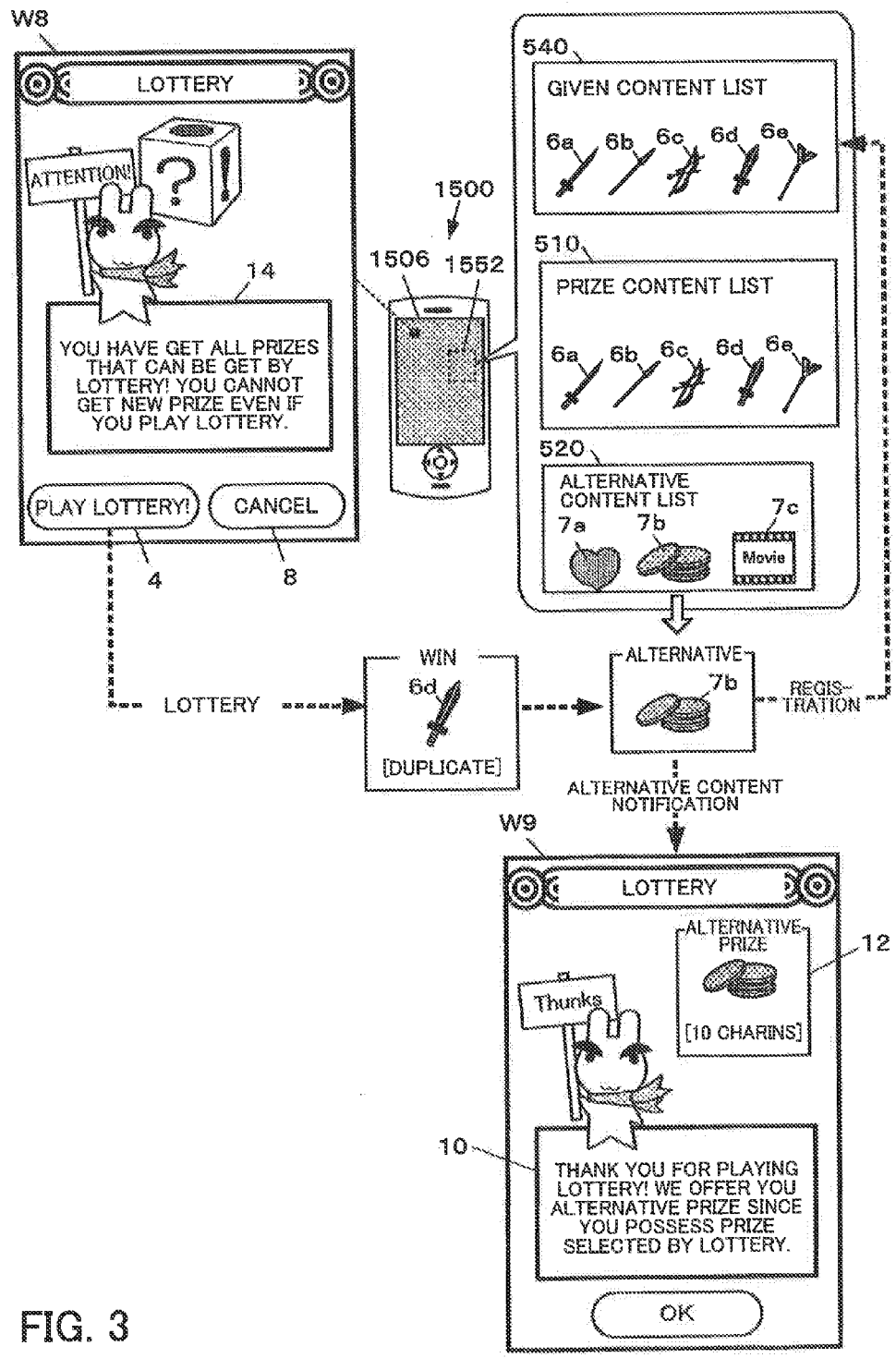
FIG. 3 is a view illustrating the concept of a prize content lottery (i.e., subgame) according to the first embodiment.

FIGS. 2 and 3 are views illustrating the concept of a prize content lottery (i.e., subgame) according to the first embodiment. A given content list 540 and a prize content list 510 are stored in the information storage medium (e.g., IC memory 1552) included in the game device 1500, a content that has been given to the player being registered in the given content list 540, and the prize content list 510 defining an option for a prize content lottery. The server system 1100 appropriately provides update data for the prize content list 510.

When a content has been given to the player (i.e., when the player has obtained a content), the content is registered in the given content list 540 regardless of whether or not that the content belongs to the prize content list 510. In the example illustrated in FIG. 2, three weapons 6a to 6c that are usable by a player character in the main game, and a non-lottery content 5 that is not given to the player as a prize content are registered in the given content list 540. Five weapons 6a to 6e are listed in the prize content list 510 as prize contents that can be given to the player. Specifically, one of the weapons 6a to 6e is selected by a lottery.

In the first embodiment, the given content list 540 and the prize content list 510 are compared when holding a lottery, and whether or not all of the prize contents that can be given to the player (i.e., all of the prize contents that can be selected) by a lottery have been given to the player who plays a lottery is checked. Specifically, whether or not all of the options have been given to the player is detected.

When some (weapons 6d and 6e in the example illustrated in FIG. 2) of the prize contents that can be given to the player have not been given to the player (i.e., when all of the options have not been given to the player), a lottery screen W8 (see FIG. 2) is displayed on the touch panel 1506, and a prize content lottery is executed when it has been detected that a lottery start icon 4 within the lottery screen W8 has been touched.

When the prize content selected by the lottery has not been given to the player, the prize content is registered in the given content list 540. Specifically, the player can obtain the prize content.

When the prize content (e.g., weapon 6c) selected by the lottery has been registered in the given content list 540, and satisfies a duplication condition, an alternative content is selected from an alternative content list 520, and given to the player instead of the prize content selected by the lottery. In the example illustrated in FIG. 2, the duplication condition is set to "1" (i.e., the number of identical prize contents possessed by the player). In the example illustrated in FIG. 2, the prize content (weapon 6c) that has been registered in the given content list 540 has been selected by the lottery, and the currency medium 7b is selected from the alternative content list 520 (in which a parameter value 7a (affinity), the currency medium 7b, and image data 7c are registered), and is given to the player. This makes it possible to prevent a situation in which an identical content is given to the player by a lottery.

When the alternative content has been given to the player, the game device 1500 displays an alternative content notification screen W9 that notifies the player that the alternative content has been given to the player. More specifically, the game device 1500 displays an alternative content giving notification display 10 that notifies the player that the alternative content has been given to the player, and an alternative content detail display 12 that notifies the player of the details of the alternative content 7 that has been given to the player.

Note that the duplication condition may be set appropriately. For example, the upper limit (e.g., "1", or "2" or more) of the number of respective prize contents that can be possessed by the player may be set as the duplication condition. When the prize content is a content that is consumed, the number of times that the prize content can be given to the user may be set as the duplication condition. For example, when the content is a movie or an image, and is consumed when the content has been played, the duplication condition (i.e., the number of times that the prize content can be given to the user) may be set to "1" or "2" since it is considered that the player does not desire to watch the same movie or image a number of times.

When it has been detected that all of the prize contents that can be given to the player by a lottery have been given to the player (i.e., when a new prize content cannot be given to the player), the game device 1500 notifies the player that the player cannot obtain a new prize content by a lottery before executing a lottery (see FIG. 3). The notification method may be set appropriately. For example, a limited availability notification display 14 may be displayed within the lottery screen W8. Specifically, the game device 1500 may notify the player that a lottery may bring disadvantages to the player.

The player who has observed the limited availability notification display 14 (that indicates that the player cannot obtain a new prize content by a lottery) may cancel a lottery by touching a lottery cancellation icon 8, or may play a lottery by touching the lottery start icon 4. If the player has become aware of the fact that the player cannot obtain a new prize content by a lottery after the player has played a lottery, the player may be discontented with the type of prize content given to the player by a lottery. According to the first embodiment, it is possible to prevent such a situation since the player is notified in advance of the fact that the player cannot obtain a new prize content by a lottery.

Note that a content that is not registered in the given content list 540, or a content that has been given to the player a number of times less than other alternative contents is preferentially selected as the alternative content.

When an upper limit is set to the number of respective alternative contents that can be possessed by the player, and it has been determined that all of the prize contents that can be given to the player by a lottery have been given to the player, and the player possesses the respective alternative contents up to the upper limit, execution of a lottery is prevented. Execution of a lottery may be prevented by an appropriate method. For example, the lottery (subgame) start icon may not be displayed, or a message that notifies the player that the player cannot play a lottery since the upper limit has been reached may be displayed within the lottery screen W8.

Functional Blocks

A functional configuration that implements the first embodiment is described below.

Figure 4:
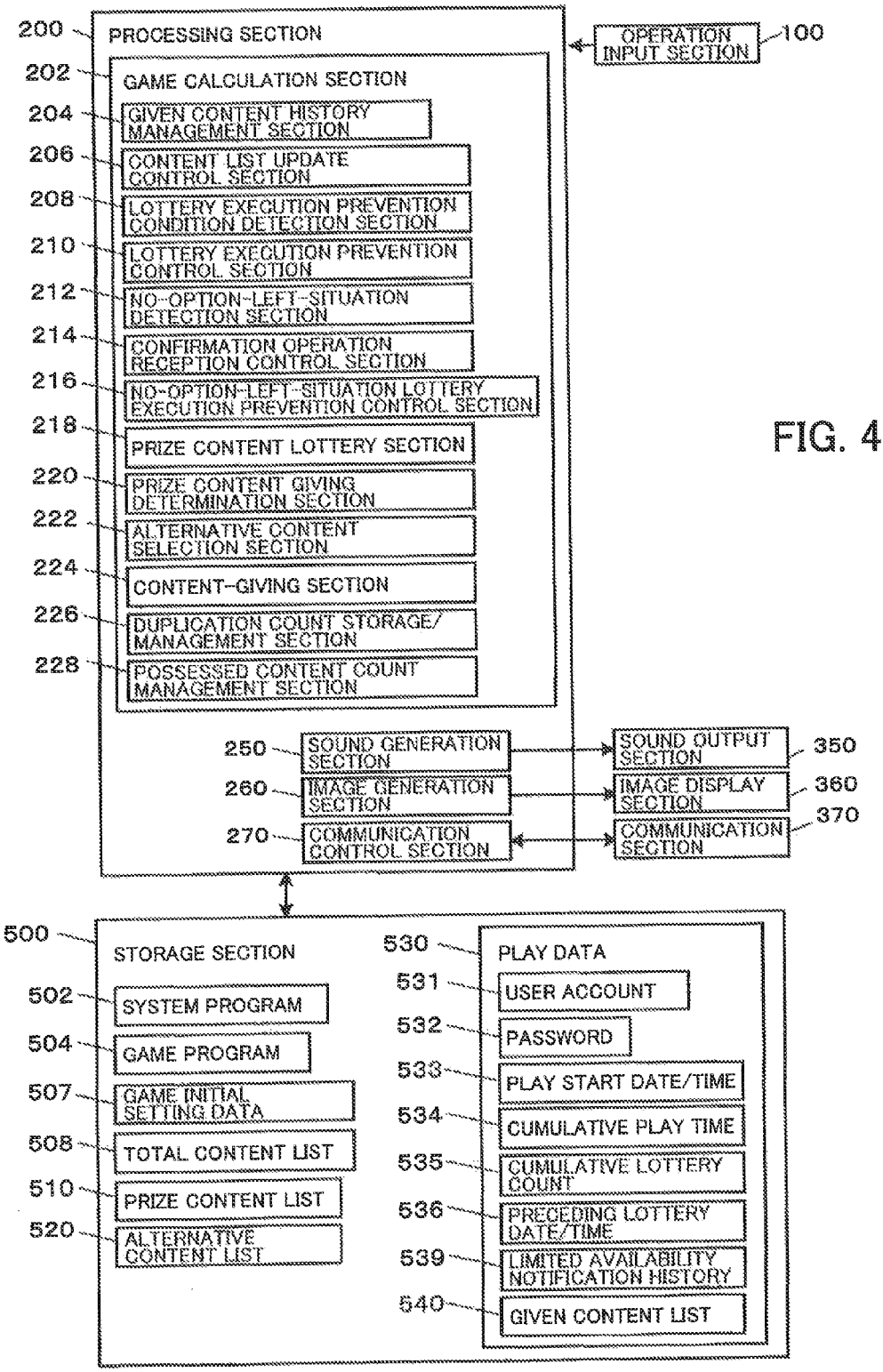
FIG. 4 is a functional block diagram illustrating an example of the functional configuration of a game device according to the first embodiment.

FIG. 4 is a functional block diagram illustrating an example of the functional configuration of the game device 1500 according to the first embodiment. As illustrated in FIG. 4, the game device 1500 includes an operation input section 100, a processing section 200, a sound output section 350, an image display section 360, a communication section 370, and a storage section 500.

The operation input section 100 outputs an operation input signal corresponding to an operation input performed by the player to the processing section 200. The operation input section 100 may be implemented by a device that is operated directly by the player with a finger (e.g., button switch, joystick, touch pad, or trackball), a device that detects motion or posture (e.g., acceleration sensor, angular velocity sensor, tilt sensor, or terrestrial magnetism sensor), or the like. The arrow key 1502, the home key 1504, and the touch panel 1506 illustrated in FIG. 1 correspond to the operation input section 100.

The processing section 200 is implemented by electronic parts such as a microprocessor (e.g., CPU and GPU), an ASIC, and an IC memory. The processing section 200 exchanges data with (controls data exchange between) each functional section, and performs a calculation process based on a given program, data, the operation input signal from the operation input section 100, and the like to control the operation of the game device 1500. The control board 1550 illustrated in FIG. 1 corresponds to the processing section 200.

The processing section 200 includes a genie calculation section 202, a sound generation section 250, an image generation section 260, and a communication control section 270.

The game calculation section 202 performs a control process necessary for executing the main game and the subgame (i.e., prize content lottery) according to the first embodiment.

For example, the game calculation section 202 may perform a user account issuance process and a login process. The game calculation section 202 may perform (1) a process that disposes a background object in a virtual three-dimensional space to form a game space, (2) a process that disposes the player character in the game space, and controls the motion of the player character corresponding to the operation input signal from the operation input section 100, (3) an AI control process that causes an NPC to appear, and automatically controls the NPC, (4) a process that manages play data that indicates the game status, and the like as the main game process. The game calculation section 202 may also appropriately perform a timing process (e.g., time limit management process) that utilizes a system clock, a flag management process, and the like.

The game calculation section 202 includes a given content history management section 204, a content list update control section 206, a lottery execution prevention condition detection section 208, a lottery execution prevention control section 210, a no-option-left-situation detection section 212, a confirmation operation reception control section 214, a no-option-left-situation lottery execution prevention control section 216, a prize content lottery section 218, a prize content giving determination section 220, an alternative content selection section 222, a content-giving section 224, a duplication count storage/management section 226, and a possessed content count management section 228 as functional sections that implement the subgame (prize content lottery).

The given content history management section 204 stores the history of (history information about) each content that has been given to the player. The history information may be identification information about the content, data of the content, the number of contents possessed by the player, the giving date/time, or the like. The history information may be set appropriately. In the first embodiment, the history information is stored and managed as the given content list 540 that is stored in the storage section 500 as play data 530 that is provided for each player. Note that the number of times that the registered content has been given as an alternative content may be stored in the given content list 540 (alternating count 544 in FIG. 7) (details thereof are described later). Therefore, the given content history management section 204 also stores the number of times that the duplication condition has been satisfied in the storage section 500. The given content history management section 204 decrements the consumption parameter (i.e., currency medium 7) that has been given to the player and is consumed when the player plays a lottery by a given value in exchange for execution of the prize content-related process. Specifically, the given content history management section 204 functions as a consumption parameter-consuming means.

The content list update control section 206 communicates with the server system 1100, and performs a control process for updating a total content list 508, the prize content list 510, and the alternative content list 520. The control process for updating the total content list 508, the prize content list 510, and the alternative content list 520 may be implemented by utilizing known technology (e.g., update program).

The lottery execution prevention condition detection section 208 detects whether or not a prize content lottery execution prevention condition has been satisfied. In the first embodiment, the lottery execution prevention condition detection section 208 detects that the prize content lottery execution prevention condition has been satisfied when all of the prize contents that can be given to the player have been given to the player, and the number of alternative contents possessed by the player has reached the upper limit. For example, the lottery execution prevention condition detection section 208 detects that the prize content lottery execution prevention condition has been satisfied when the player possesses the weapons 6a to 6e, and the number of currency media 7 possessed by the player has reached the upper limit (see FIG. 3). Specifically, the lottery execution prevention condition detection section 208 functions as a currency medium upper limit detection means.

The lottery execution prevention control section 210 prevents execution of a prize content lottery when the lottery execution prevention condition detection section 208 has detected that the prize content lottery execution prevention condition has been satisfied. The lottery execution prevention control section 210 notifies the player that the player cannot play a prize content lottery, and also notifies the player of the reason therefor. For example, the lottery execution prevention control section 210 displays the limited availability notification display 14 before a prize content lottery is executed when the player possesses the weapons 6a to 6e and the number of currency media 7 possessed by the player has reached the upper limit (see FIG. 3). Specifically, the lottery execution prevention control section 210 implements an upper-limit-reached-situation lottery execution notification control function that issues a given notification prior to selection using a selection means, and an upper-limit-reached-situation lottery execution prevention function that prevents execution of a lottery when a lottery does not necessarily bring advantages to the player.

The no-option-left-situation detection section 212 can detect that all of the prize contents that are stored in the prize content list 510 stored in the storage section 500 and may be given to the player as a result of a lottery have been given to the player.

The confirmation operation reception control section 214 notifies the player of the detection result of the no-option-left-situation detection section 212 prior to execution of a lottery, and receives an operation that indicates whether or not to play a lottery. More specifically, the confirmation operation reception control section 214 displays the limited availability notification display 14 (see FIG. 3), and changes the lottery start icon 4 to prompt the player to confirm that player plays a lottery in spite of the limited availability notification display 14.

The no-option-left-situation lottery execution prevention control section 216 skips a prize content lottery (prevents execution of a prize content lottery) when the confirmation operation reception control section 214 has received an operation that indicates that the player does not play a lottery.

The prize content lottery section 218 executes a prize content lottery. More specifically, the prize content lottery section 218 selects prize contents that can be given to the player by a lottery from the prize contents registered in the prize content list 510, and selects one of the selected prize contents using probability calculations (random-number calculations).

The prize content giving determination section 220 determines whether or not to give the prize content selected by a lottery to the player. More specifically, the prize content giving determination section 220 determines to give the prize content selected by a lottery to the player when the prize content does not satisfy the duplication condition, and determines not to give the prize content selected by a lottery to the player when the prize content satisfies the duplication condition. The prize content giving determination section 220 appropriately refers to information about the duplication condition stored in the prize content list 510 (duplication upper limit 515 in FIG. 5).

The alternative content selection section 222 selects an appropriate alternative content from the alternative content list 520 when the prize content giving determination section 220 has determined not to give the prize content selected by a lottery to the player. In the first embodiment, a selection condition whereby each alternative content is selected is set to each alternative content. The selection condition may include the number of times that the prize content giving determination section 220 has determined that the duplication condition has been satisfied (i.e., the number of times (i.e., alternating count) that the alternative content has been given to the player) as a parameter. Therefore, the alternative content selection section 222 substantially functions as an alternative content change means that changes the alternative content given to the player based on the number of times that the alternative content has been given to the player. The selection condition may include the type of the duplication content as a parameter.

The content-giving section 224 performs a control process that gives a content (i.e., a prize content selected by the prize content lottery section 218 or an alternative content selected by the alternative content selection section 222) to the player. More specifically, the content-giving section 224 registers information about the content given to the player in the given content list 540 included in the play data 530 stored in the storage section 500.

In the example illustrated in FIGS. 2 and 3 in which a given number of currency media 7 are given to the player as the alternative content, the number of currency media 7 registered in the given content list 540 is incremented (changed) by the given number.

In the first embodiment in which image data and a parameter value used in the game are used as the alternative content, the content-giving section 224 functions as an image-giving means that gives an image to the player as the alternative content, and a parameter value giving means that gives a parameter value that can be added to a given game parameter to the player as the alternative content.

The duplication count storage/management section 226 stores the number of times that the alternative content has been given to the player as a result of a prize content lottery. In the first embodiment, the number of times (alternating count) that each alternative content has been given to the player is registered for each content in the given content list 540.

The possessed content count management section 228 manages the number of contents that have been given to the player (i.e., the number of contents possessed by the player). When the content is a content that is consumed, the number of contents possessed by the player may be decremented when the content has been used.

Although the above description has been given taking an example in which the functional sections that implement the subgame (prize content lottery) are included in the game calculation section 202, the functional sections that implement the subgame (prize content lottery) may be included in the processing section 200.

The sound generation section 250 is implemented by a processor (e.g., digital signal processor (DSP) or sound synthesis IC), an audio codec that can reproduce a sound file, and the like. The sound generation section 250 generates sound signals of a game effect sound, background music (BGM), or an operation sound based on the processing results of the game calculation section 202, and outputs the generated sound signals to the sound output section 350.

The sound output section 350 is implemented by a device that outputs a game effect sound, BGM, a telephone voice, and the like based on the sound signals input from the sound generation section 250. The speaker 1510 illustrated in FIG. 1 corresponds to the sound output section 350.

The image generation section 260 is implemented by a processor (e.g., graphics processing unit (GPU) or a digital signal processor (DSP)), a video signal IC, a program (e.g., video codec), a drawing frame IC memory (e.g., frame buffer), a texture data IC memory, and the like. The image generation section 260 generates a game screen (image) every frame (e.g., 1/60th of a second) based on the results of the process performed by the game calculation section 202, and outputs an image signal of the generated game screen (image) to the image display section 360.

The image display section 360 displays a game image based on the image signal input from the image generation section 260. The image display section 360 may be implemented by an image display device such as a flat panel display, a cathode-ray tube (CRT), a projector, or a head-mounted display. The touch panel 1506 illustrated in FIG. 1 corresponds to the image display section 360.

The communication control section 270 performs a connection process and a data process for implementing data communication, and exchanges data with an external device via the communication section 370.

The communication section 370 connects to the communication line 1 to implement communication. The communication section 370 is implemented by a transceiver, a modem, a terminal adapter (TA), a jack for a communication cable, a control circuit, and the like. The communication device 1553 illustrated in FIG. 1 corresponds to the communication section 370.

The storage section 500 stores a program, data, and the like that implement a function for causing the processing section 200 to integrally control the game device 1500. The storage section 500 is used as a work area for the processing section 200, and temporarily stores the results of calculations performed by the processing section 200 based on a program, data input from the operation section 100, and the like. The function of the storage section 500 is implemented by an IC memory (e.g., RAM and ROM), a magnetic disk (e.g., hard disk), an optical disk (e.g., CD-ROM and DVD), or the like.

The IC memory 1552 included in the control board 1550 and the memory card 1540 illustrated in FIG. 1 correspond to the storage section 500.

In the first embodiment, the storage section 500 stores a system program 502 and a game program 504. The system program 502 is a basic program that implements the basic functions of the game device 1500 (computer). The game program 504 causes the processing section 200 to implement the functions of the game calculation section 202.

The storage section 500 also stores (1) game initial setting data 507 that includes data necessary for generating a game world, and controlling the display and the motion of a character (e.g., player character or non-player character) that appears in the game, (2) the total content list 508 that is a list of all of the contents that can be used in the game, (3) the prize content list 510 that is a list of the prize contents that may be selected by a lottery, (4) the alternative content list 520 that is a list of the alternative contents, and (5) the play data 530 that indicates the game status. The storage section 500 also appropriately stores data (e.g., decompressed texture data, elapsed time, timer value, counter value, and flag) necessary when performing each process.

The game program 504, the game initial setting data 507, the total content list 508, the prize content list 510, and the alternative content list 520 may be stored in the IC memory 1552 or the memory card 1540 in advance, or may be downloaded from the server system 1100 or the like.

As illustrated in FIG. 5, the prize content list 510 includes a prize content ID 511, content data 512, a selection condition 513, a win probability 514, and a duplication upper limit 515 corresponding to each prize content that may be selected by a lottery, for example.

The prize content ID 511 is identification information (specific value) that identifies the content.

The content data 512 is main data of the prize content. For example, (1) an item that can be used by the player character or the like in the game, (2) a currency medium, (3) a parameter value (e.g., experience value, attack capability, or affinity), (4) event execution data (e.g., movie data, sound data, and character control data) for executing an event in the game, and the like may be appropriately set as the content data 512.

The selection condition 513 defines a condition whereby the corresponding prize content can be selected as the lottery target.

The selection condition 513 may be set so that the prize content can be always selected (see "ALWAYS" in FIG. 5). The selection condition 513 may be a condition the utilizes the cumulative play time as a parameter (see "CUMULATIVE PLAY TIME>50 HOURS" in FIG. 5), may be a condition the utilizes the elapsed time from the start of game play as a parameter (see "7 DAYS ELAPSED AFTER START OF GAME PLAY" in FIG. 5), or may be a condition the designates a specific date (see "FEBRUARY 14" in FIG. 5) or a specific period (see "JANUARY 1 to JANUARY 3" in FIG. 5), for example. The selection condition 513 may be a condition whereby the number of given items possessed by the player is equal to or larger than a reference value, a condition whereby the cumulative lottery count is equal to or larger than a reference value, or the like.

The win probability 514 defines the win probability of the corresponding prize content when the player plays a lottery in a state in which the prize content satisfies the selection condition 513. For example, the selection condition 513 is set to "ALWAYS", and the win probability 514 is set to "0.3%" (i.e., is relatively low) for the prize content ID "CNT035". Therefore, the player rarely wins the prize content having the prize content ID "CNT035". The selection condition 513 is set to "FEBRUARY 14" for the prize content ID "CNT057". In this case, the prize content having the prize content ID "CNT057" can be selected when the player plays a lottery on February 14 (i.e., the player necessarily wins the prize content having the prize content ID "CNT057" when the player plays a lottery on February 14).

The duplication upper limit 515 is the upper limit of the number of the corresponding prize contents that can be possessed by one player. In the first embodiment, the duplication upper limit 515 corresponds to the duplication condition set to the prize content.

The alternative content list 520 (see FIG. 4) includes an alternative content ID 521 (i.e., identification information about the alternative content), content data 522 (i.e., main data of the alternative content), a selection condition 523, and a possession count upper limit 524 (see FIG. 6), for example. The possession count upper limit 524 defines the upper limit of the number of corresponding alternative contents that can be possessed by one player.

The consumption parameter value (corresponding to "CURRENCY MEDIUM" in FIG. 6) that is consumed when the player plays a lottery, an item, event data, an ability parameter value of the player character (corresponding to "DEFENSE CAPABILITY: +2 TO +10" in FIG. 6), a limited time item, or the like may be appropriately set as the content data 522. The content data 522 may be set so that the quantity given to the player by a lottery or the like can be set variably (e.g., "DEFENSE CAPABILITY: +2 TO +10" in FIG. 6). Note that a given consumption parameter value (that is consumed when the player plays a lottery) may be given to the player in the initial state, or may be given to the player when the player has logged in so that the player can play a lottery once a day.

An alternating count (i.e., the number of times that the alternative content has been given to the player), a date/time, or the type of the content that has been determined to have satisfied the duplication condition (corresponding to "DUPLICATION OF RARE ITEM E" in FIG. 6) may be set as the parameter of the selection condition 523.

The play data 530 (see FIG. 4) includes data that indicates the game status of the main game. When the main game is an RPG, the play data 530 may include (1) the type of the player character, (2) an ability parameter value (e.g., hit points (HP), defense capability, attack capability, or experience value), (3) the current position on the game map, (4) a possessed item list, (5) the date/time in the game world, and the like. Note that the main game data may be appropriately set corresponding to the game. The main game data is appropriately updated corresponding to the game status in the same manner as in a known game execution control process.

In the first embodiment, the play data 530 includes a user account 531, a password 532, a play start date/time 533, a cumulative play time 534, a cumulative lottery count 535, a preceding lottery date/time 536, a limited availability notification history 539, and the given content list 540.

The user account 531 and the password 532 are set through a given registration process when the player plays the game for the first time.

The play start date/time 533 is the date/time when the player has played the main game for the first time. The initial value of the cumulative play time 534 is set to "0". The cumulative play time 534 is automatically incremented when the player plays the main game.

The cumulative lottery count 535 is the cumulative number of times that the player has played a prize content lottery, and is automatically incremented when the player has played a prize content lottery.

The preceding lottery date/time 536 is the date/time when the player has played the last prize content lottery, and is automatically updated when the player has played a prize content lottery.

The limited availability notification history 539 is history data about a notification that notifies the player that all of the prize contents that can be given to the player have been given to the player (e.g., history data about the limited availability notification display 14 illustrated in FIG. 3) when it has been detected that all of the prize contents that can be given to the player have been given to the player when starting a lottery. For example, the limited availability notification history 539 includes the notification date/time. The limited availability notification history 539 may appropriately include a list of the prize content ID 511 of the available prize content, and replicated data of the given content list 540.

The given content list 540 is historical information about the given contents including the prize content and the alternative content. The given content list 540 includes a content ID 541 (i.e., identification information about the given content), content data 542 (i.e., main data of the given content), a current possession count 543, an alternating count 544, and a giving date/time 545 (see FIG. 7), for example. The possession count 543 is incremented each time the content has been given to the player. When the corresponding content is a content that is consumed, the possession count 543 is decremented each time the content has been used or transferred. The alternating count 544 is the cumulative number of times that the content has been given to the player as the alternative content. Therefore, the alternating count 544 indicates the total number of times that the duplication condition has been satisfied.

Process Flow

The flow of the process performed by the game device 1500 according to the first embodiment is described below. The following process is implemented by causing the processing section 200 to execute the game program 504. Note that the player has completed an initial setting process (e.g., user registration and selection of the player character used in the main game).

Figure 8:
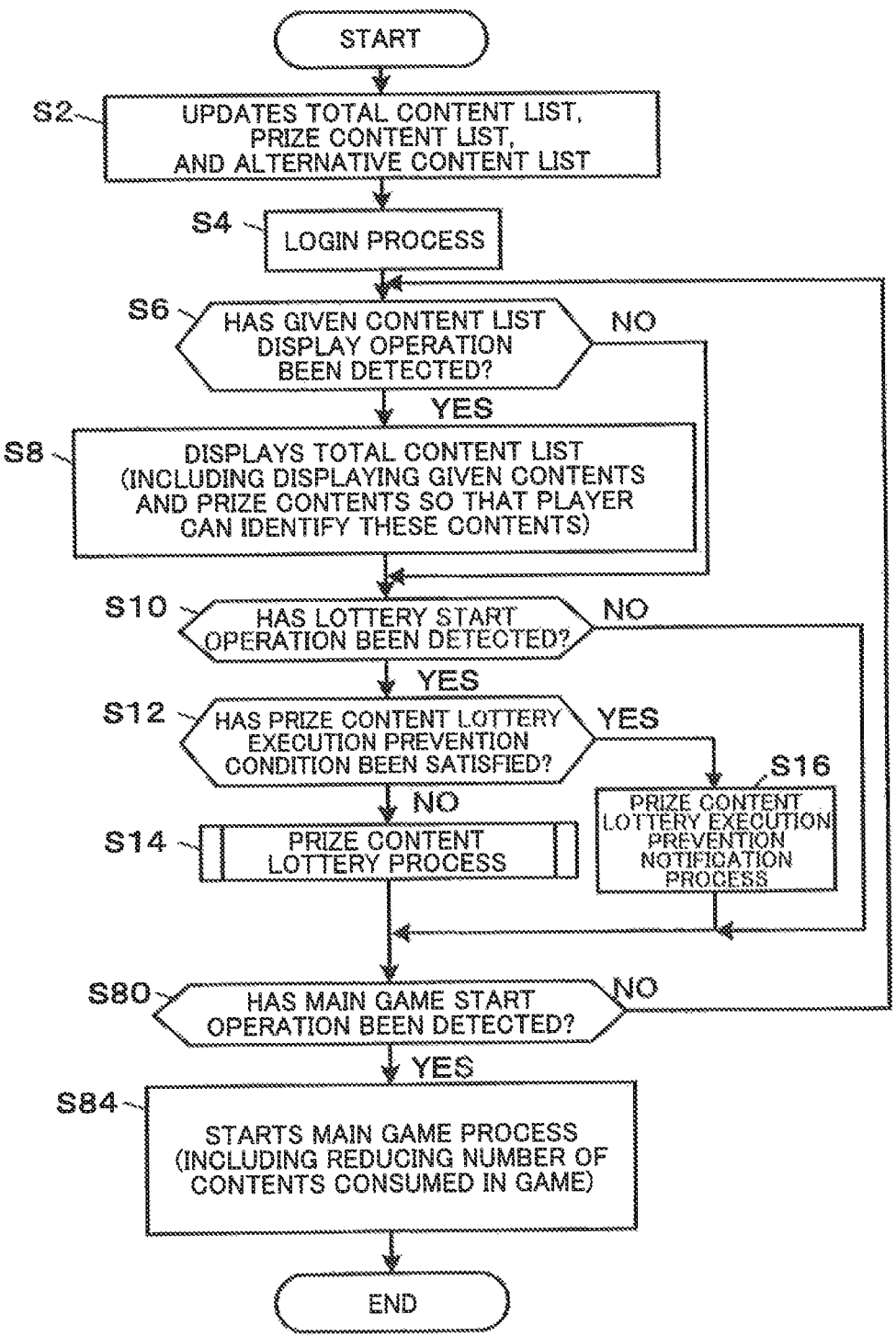
FIG. 8 is a flowchart illustrating the flow of a prize content lottery process performed by a game device according to the first embodiment.

FIG. 8 is a flowchart illustrating the flow of a prize content lottery process performed by the game device 1500 according to the first embodiment. The processing section 200 included in the game device 1500 accesses the server system 1100 via the communication line 1, and updates the total content list 508, the prize content list 510, and the alternative content list 520 (step S2).

The processing section 200 then performs a login process (step S4). Specifically, the processing section 200 displays a given input screen that prompts the player to input the user account and the password, and performs a user authentication process. When the user authentication process has successfully completed, the processing section 200 automatically gives the consumption parameter (i.e., "currency medium" content) that is consumed when the player plays a prize content lottery to the player so that the player can play a lottery once (i.e., consumption parameter "10").

When the processing section 200 has detected a given content (i.e., the content possessed by the player) list display operation (YES in step S6), the processing section 200 refers to the total content list 508 and the given content list 540 included in the play data 530, and displays the given contents in the total content list so that the given contents can be identified (step S8). More specifically, the processing section 200 displays the contents registered in the given content list 540 so that the player can identify that the contents have been given to the player. The processing section 200 also displays the contents registered in the prize content list 510 so that the player can identify that the contents can be obtained by a lottery (e.g., a given mark is assigned to the contents).

When the processing section 200 has detected a given lottery start operation after completion of the user authentication process (YES in step S10), the processing section 200 determines whether or not the prize content lottery execution prevention condition has been satisfied (step S12). In the first embodiment, the processing section 200 refers to the prize content list 510, the alternative content list 520, and the given content list 540, and determines (detects) that the prize content lottery execution prevention condition has been satisfied when all of the prize contents registered in the prize content list 510 have been given to the player, and each alternative content registered in the alternative content list 520 is possessed by the player up to the possession count upper limit 524.

When the processing section 200 has determined that the prize content lottery execution prevention condition has not been satisfied (NO in step S12), the processing section 200 performs a prize content lottery process (step S14). When the processing section 200 has determined that the prize content lottery execution prevention condition has been satisfied (YES in step S12), the processing section 200 skips the prize content lottery process, and performs a prize content lottery execution prevention notification process (step S16). The prize content lottery execution prevention notification process may include displaying an alarm message that notifies the player that the player cannot possess a prize content selected by a lottery, and receiving a confirmation operation performed by the player.

When the processing section 200 has detected a given main game start operation after completion of the user authentication process (YES in step S80), the processing section 200 controls the main game (step S84). The contents included in the given content list 540 can be used in the game. When the content is a content that is consumed, the number of the contents possessed by the player is decremented each time the content has been used in the game.

Figure 9:
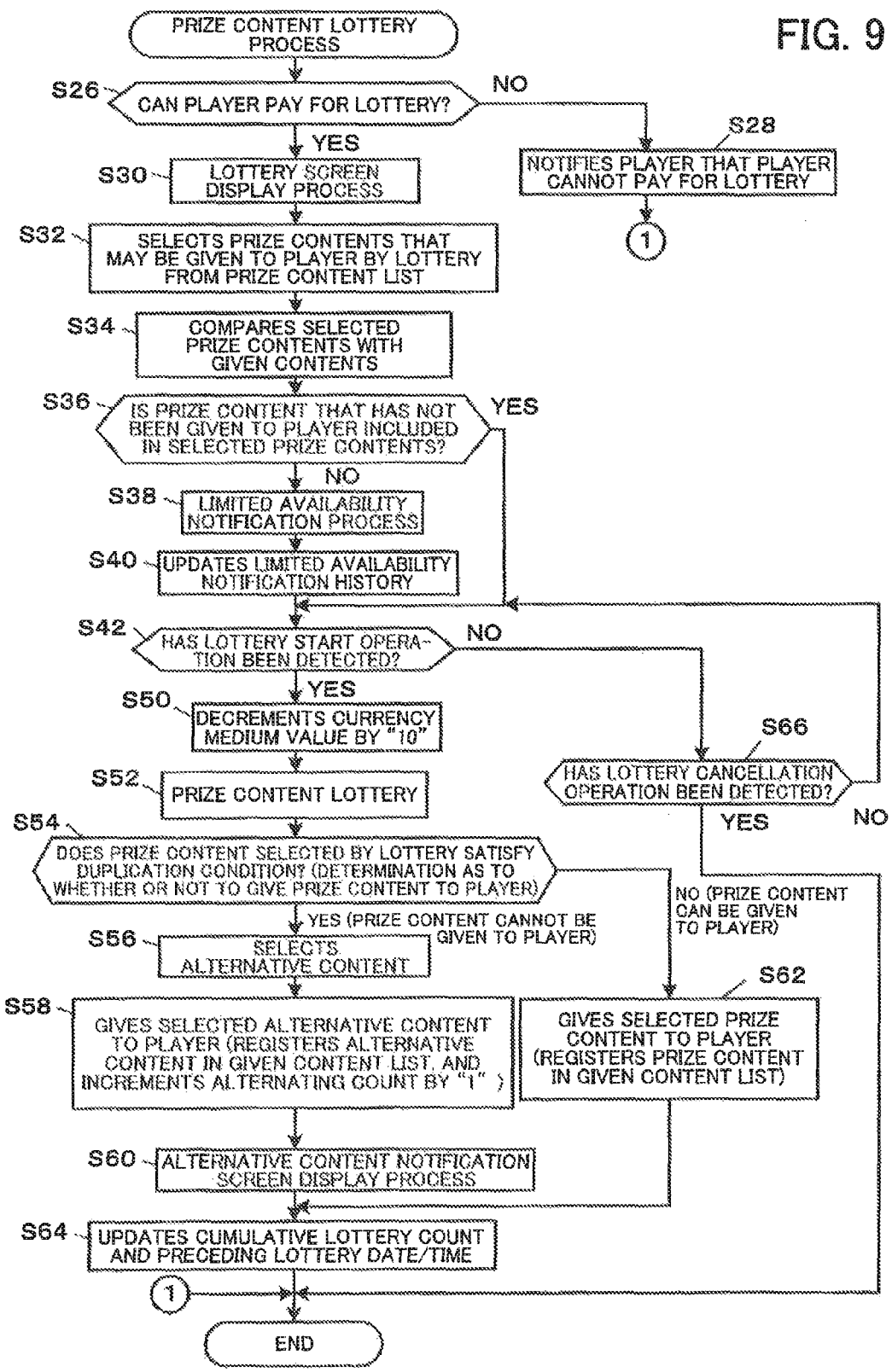
FIG. 9 is a flowchart illustrating the flow of a prize content lottery process according to the first embodiment.

FIG. 9 is a flowchart illustrating the flow of the prize content lottery process according to the first embodiment.

The processing section 200 determines whether or not the player can pay for a lottery (step S26). In the first embodiment, 10 currency media (10 charins) are consumed when the player plays a prize content lottery. Therefore, the processing section 200 refers to the currency medium possession count 543 included in the given content list 540. When the processing section 200 has determined the possession count 543 is less than "10" (NO in step S26), the processing section 200 performs a process that notifies the player that the player cannot pay for a lottery (step S28), and terminates the prize content lottery process.

When the processing section 200 has determined that the player can pay for a lottery (YES in step S26), the processing section 200 displays the lottery screen W8 (step S30). The processing section 200 then extracts the prize contents that may be given to the player by a lottery from the prize content list 510 (step S32). More specifically, the processing section 200 selects the prize content ID 511 that currently satisfies the selection condition 513 (see FIG. 5). The processing section 200 then compares the selected prize contents with the given content list 540 (step S34).

When the processing section 200 has determined that a prize content that has not been given to the player is not included in the prize contents selected in the step S32 (i.e., all of the prize contents selected in the step S32 have been given to the player) (NO in step S36 (see FIG. 3)), the processing section 200 performs a limited availability notification process (step S38).

More specifically, the processing section 200 displays the limited availability notification display 14 (see FIG. 3) within the lottery screen W8. The processing section 200 preferably changes the display state of the lottery start icon 4 from the normal display state (see FIG. 2) to a display state that notifies the player that the player will take a risk in playing a lottery. The processing section 200 also registers the current date/time and the like as the limited availability notification history 539 (step S40).

When the processing section 200 has determined that a prize content that has not been given to the player is included in the prize contents selected in the step S32 (i.e., a prize content that has not been acquired by the player is present) (YES in step S36 (see FIG. 2)), the processing section 200 skips the limited availability notification process and update of the limited availability notification history 539.

When the processing section 200 has detected that the lottery start icon 4 displayed within the lottery screen W8 has been touched (YES in step S42), the processing section 200 decrements the currency medium (consumption parameter) possession count of the player by a given number (step S50), and executes a prize content lottery (step S52).

The processing section 200 then determines whether or not the prize content selected by the lottery satisfies the duplication condition (step S54). More specifically, the processing section 200 checks whether or not the prize content ID 511 (see FIG. 5) of the prize content selected by the lottery is included in the given content list 540 of the player, and determines that the prize content selected by the lottery satisfies the duplication condition when the prize content ID 511 of the prize content selected by the lottery is included in the given content list 540, and the possession count 543 has reached the duplication upper limit 515 of the prize content selected by the lottery.

When the processing section 200 has determined that the prize content selected by the lottery satisfies the duplication condition (YES in step S54), the processing section 200 performs an alternative content selection process (step S56). Specifically, the processing section 200 extracts the alternative content ID 521 that satisfies the selection condition 523 included in the alternative content list 520, and extracts the alternative contents that are not registered in the given content list 540. The processing section 200 then selects a given number of alternative contents (normally one alternative content) from the extracted alternative contents by a lottery. When the processing section 200 has determined that all of the alternative contents are registered in the given content list 540, the processing section 200 refers to the possession count 543 of each alternative content, and preferentially selects an alternative content of which the possession count 543 is small. The processing section 200 then gives the selected alternative content to the player (step S58). Specifically, the processing section 200 registers the alternative content in the given content list 540 (i.e., updates the given content list 540). The processing section 200 then displays the alternative content notification screen W9 (step S60).

When the processing section 200 has determined that the prize content selected by the lottery does not satisfy the duplication condition (NO in step S54), the processing section 200 registers the prize content selected by the lottery in the step S52 in the given content list 540, and gives the prize content to the player (step S62).

When the processing section 200 has given the prize content or the alternative content to the player, the processing section 200 updates the cumulative lottery count 535 and the preceding lottery date/time 536 (step S64), and terminates the prize content lottery process.

When the lottery cancellation icon 8 displayed within the lottery screen W8 has been touched, the processing section 200 detects the lottery cancellation operation (YES in step S66), and terminates the prize content lottery process without executing a prize content lottery.

The first embodiment thus provides the player with a novel lottery element that implements a more attractive lottery.

More specifically, it is possible to prevent a situation in which the player is discontented with the type of prize content given to the player by a lottery.

It is also possible to notify the player that the player cannot obtain a new prize content by a lottery when the player has obtained all of the prize contents that can be obtained by a lottery. This means that information disadvantageous for the player can be provided to the player.

It is also possible to give the alternative content to the player when the player possesses the prize content selected by a lottery.

Since a content that has not been given to the player, or a content that has been given to the player in a small number, can be preferentially selected as the alternative content, it is possible to prevent a situation in which the player is discontented with the lottery.

Second Embodiment

A second embodiment to which the invention is applied is described below taking an example of executing a multi-player online game that includes a prize content lottery as a subgame. Note that the same elements as those described above in connection with the first embodiment are indicated by identical reference signs, and detailed description thereof is omitted. The following description mainly focuses on the differences from the first embodiment.

Figure 10:
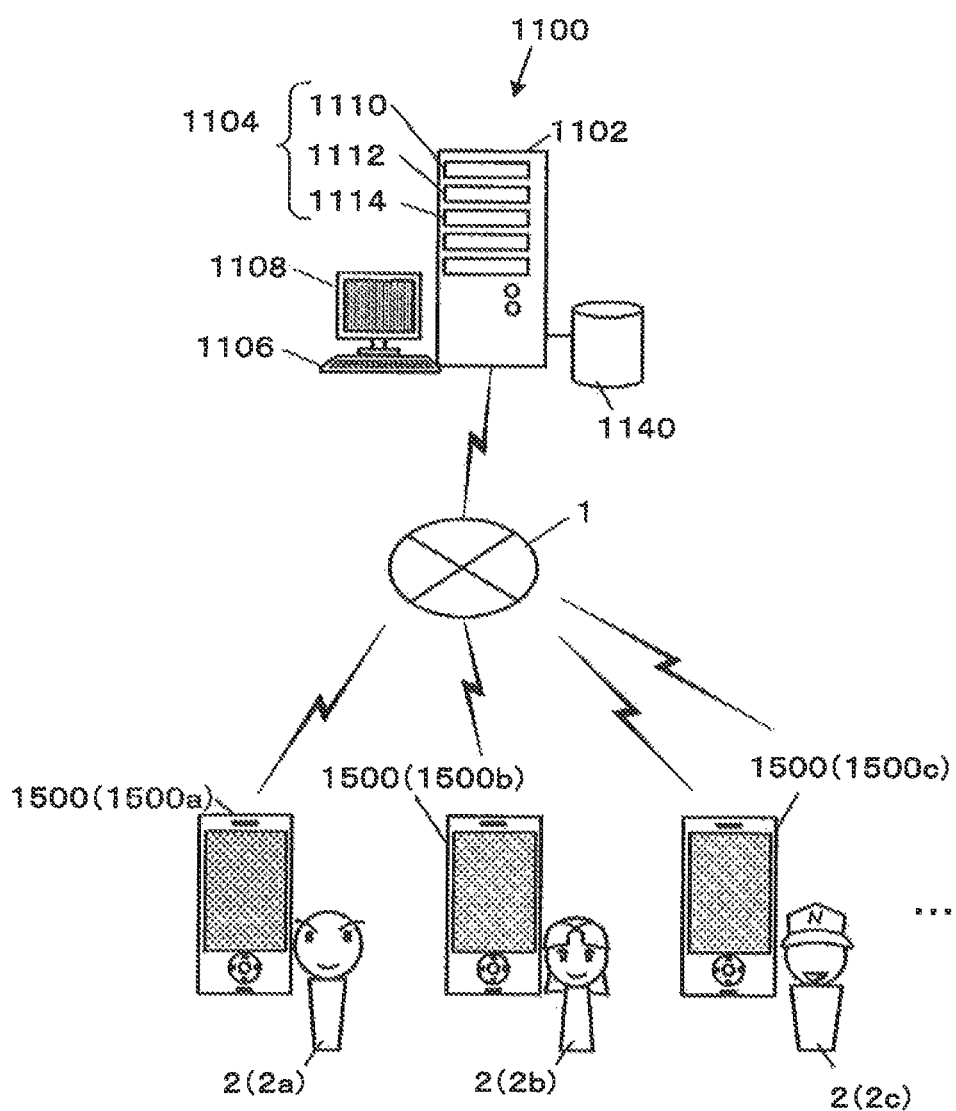
FIG. 10 is a view illustrating an example of the configuration of a game system according to a second embodiment.

FIG. 10 is a view illustrating an example of the configuration of a game system according to the second embodiment. The game system according to the second embodiment includes a server system 1100 that can connect to a communication line 1, and a game device 1500 (1500a, 1500b, 1500c, . . . ) that is provided for each player 2 (2a, 2b, 2c, . . . ) who plays the game.

In the second embodiment, when the player desires to play the game using the game device 1500 (i.e., player terminal), it is necessary to execute a game client program 506 (see FIG. 11) acquired in advance, access the server system 1100 before starting the game to acquire a user account, and perform a given login process to obtain user authentication. A prize content lottery according to the second embodiment is implemented as part of the game that is implemented by executing the game client program 506 in the same manner as in the first embodiment.

The server system 1100 includes one or a plurality of server devices, a storage device, and the like. The server system 1100 provides various services for managing the multi-player online game, manages play data necessary for executing the game, and distributes a client program and various types of data. The server system 1100 includes a housing 1102, a keyboard 1106, a touch panel 1108, and a storage 1140. A plurality of blade servers 1104 are provided in the housing 1102.

The blade servers 1104 include (1) an account management server 1110 that implements a user registration process, a player character initial setting process, and a group management function that manages linking between a group and a user (player) who belongs to the group, (2) a lottery management server 1112 that implements a prize content lottery process, and (3) a game management server 1114 that manages a program, data, and the like necessary for executing the game, and distributes the program, data, and the like to the game device 1500 that participates in the multi-player online game (main game), for example. When implementing a prize content lottery as a service of the main game, the game management server 1114 implements the function of the lottery management server 1112.

Note that each of the blade servers 1104 may be implemented as an independent device that can perform data communication through the communication line 1, and appropriately exchanges information necessary for the server system 1100. The function of each blade server 1104 may be implemented by a plurality of blade servers 1104 in cooperation.

A functional configuration that implements the second embodiment is described below.

Figure 11:
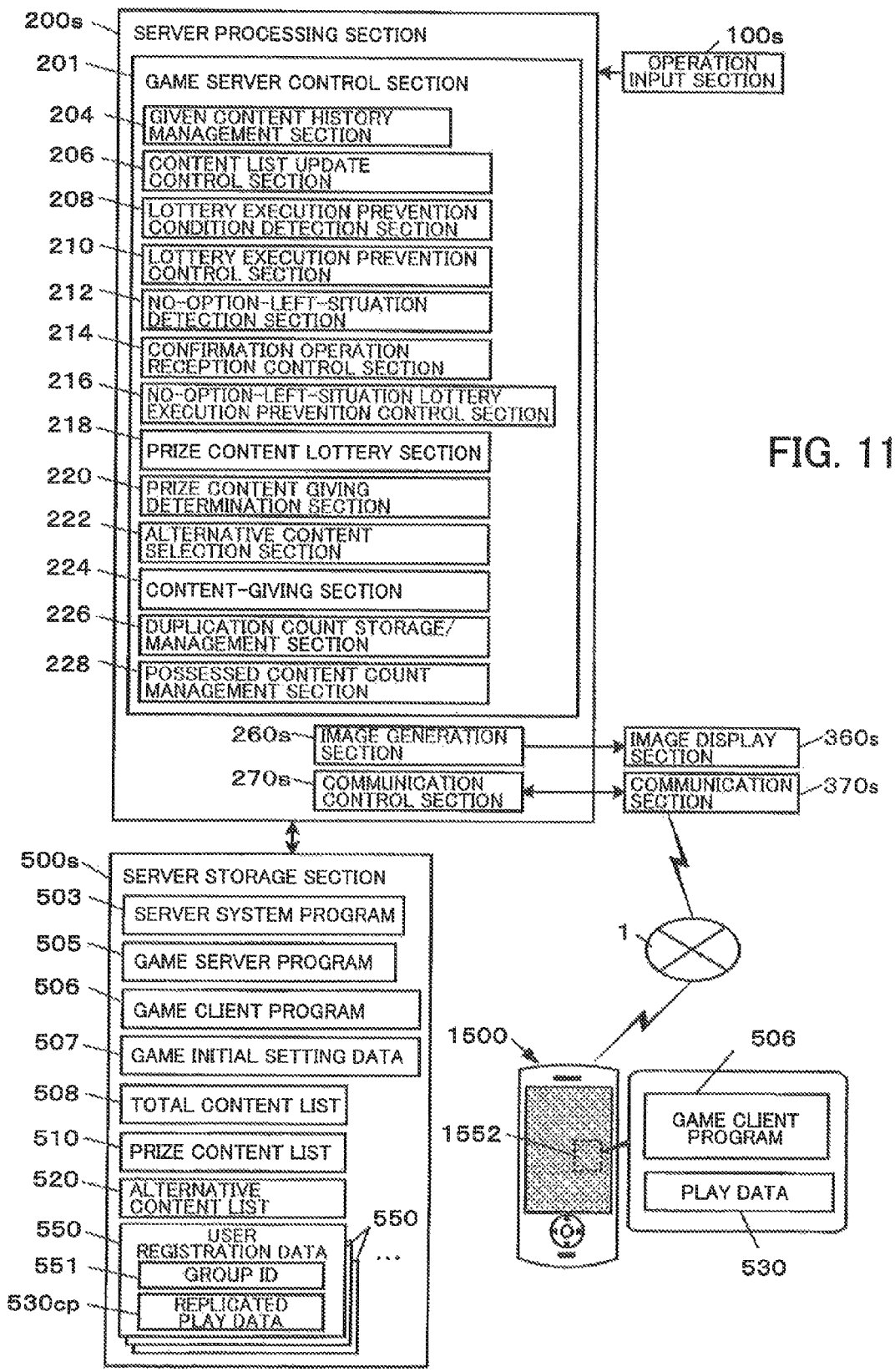
FIG. 11 is a functional block diagram illustrating an example of the functional configuration of a server system according to the second embodiment.

FIG. 11 is a functional block diagram illustrating an example of the functional configuration of the server system 1100 according to the second embodiment. As illustrated in FIG. 11, the server system 1100 includes an operation input section 100s, a server processing section 200s, an image display section 360s, a communication section 370s, and a server storage section 500s.

The operation input section 100s corresponds to the operation input section 100 according to the first embodiment, and outputs an operation input signal corresponding to an operation input performed by the server operator to the server processing section 200s. The keyboard 1106 and the touch panel 1108 illustrated in FIG. 1 correspond to the operation input section 100s.

The server processing section 200s is implemented by electronic parts such as a microprocessor (e.g., CPU and GPU), an ASIC, and an IC memory. The server processing section 200s exchanges data with each functional section, and performs a calculation process based on a given program, data, the operation input signal from the operation input section 100s, a request from an external device (another computer or game device 1500) that has accessed the game server 1100 from the outside via the communication section 370s, and the like to control the operation of the server system 1100. The blade server 1104 (i.e., control board) illustrated in FIG. 10 corresponds to the server processing section 200s. The server processing section 200s according to the second embodiment includes a game server control section 201, an image generation section 260s, and a communication control section 270s.

The game server control section 201 implements a function of preparing/executing the main game and the subgame.

For example, the game server control section 201 performs a user account issue process, a login process, a process necessary for the main game (multi-player online game), a process that registers the player in a group together with another player who has met the player during the game (i.e., the group management function that manages linking between a group and a player who belongs to the group), and the like. These processes may be implemented by appropriately utilizing known multi-player online game technology.

The game server control section 201 includes a given content history management section 204, a content list update control section 206, a lottery execution prevention condition detection section 208, a lottery execution prevention control section 210, a no-option-left-situation detection section 212, a confirmation operation reception control section 214, a no-option-left-situation lottery execution prevention control section 216, a prize content lottery section 218, a prize content giving determination section 220, an alternative content selection section 222, a content-giving section 224, a duplication count storage/management section 226, and a possessed content count management section 228 as functional sections that implement the subgame (prize content lottery).

The game server control section 201 may also appropriately perform a timing process (e.g., time limit timing process) that utilizes a system clock, a flag management process, and the like. The game server control section 201 may also appropriately perform a data decoding process, a texture decompression process, and the like, as required. Note that the game server control section 201 need not necessarily perform these processes (i.e., these processes may be appropriately added or omitted depending on the game and its implementation mode). These processes may be implemented in the same manner as in a known multi-player online game.

The image generation section 260s corresponds to the image generation section 260 according to the first embodiment.

The imago display section 360s corresponds to the image display section 360 according to the first embodiment. The touch panel 1108 illustrated in FIG. 9 corresponds to the image display section 360s.

The communication control section 270s corresponds to the communication control section 270 according to the first embodiment. The communication control section 270s exchanges data with an external device via the communication section 370s.

The communication section 370s corresponds to the communication section 370 according to the first embodiment. The communication section 370s connects to the communication channel 1, and implements communication.

The server storage section 500s stores a program and game data that cause the server processing section 200s to implement its functions. The server storage section 500s is used as a work area for the server processing section 200s, and temporarily stores the results of calculations performed by the server processing section 200s based on a program, information received from the game device 1500, and the like. The function of the server storage section 500s is implemented by an IC memory (e.g., RAM and ROM), a magnetic disk (e.g., hard disk), an optical disk (e.g., CD-ROM and DVD), or the like. The information storage medium (e.g., IC memory) provided in the blade server 1104 and the storage 1140 illustrated in FIG. 10 correspond to the server storage section 500s.

The server storage section 500s stores a server system program 503, a game server program 505, a game client program 506, game initial setting data 507, user registration data 550 that includes information necessary for user authentication, a total content list 508, a prize content list 510, and an alternative content list 520. The server storage section 500s also appropriately stores information (e.g., given period count value and flag) that is required for a game management process, a friend login bonus-giving process, and the like.

In the second embodiment, a function that registers another player who has met the player during the game is provided. The user registration data 550 includes a group ID 551 that is identification information about a group formed by the player and another player who has met the player during the game. Note that the account of another player who has met the player during the game may be registered in a friend list. The user registration data 550 also includes replicated play data 530cp of the play data 530 of the user (player).

The server system program 503 causes a computer to implement the basic functions of a server.

The game server program 505 causes the server processing section 200s to implement the functions of the game server control section 201.

The game client program 506 is an original client program provided to the game device 1500 that has issued a game participation request. The game device 1500 stores the game client program 506 downloaded from the server system 1100 in the information storage medium, and executes the game client program 506. The game client program 506 is implemented by a dedicated program, a web browser program, a plug-in that implements dynamic display on the web browser program, or the like. A plug-in that implements dynamic display on the web browser program may be used when implementing the online game as a browser game.

Figure 12:
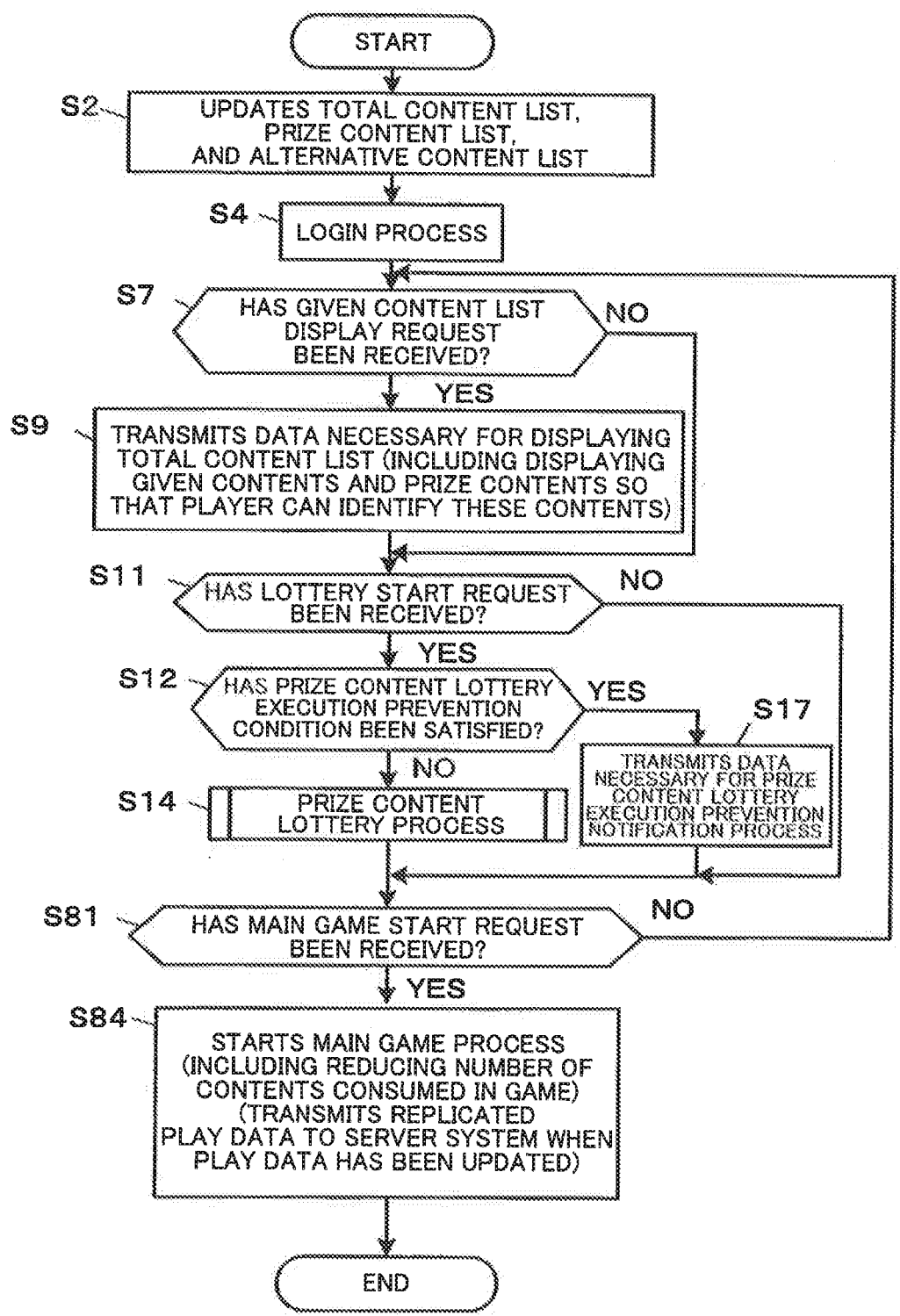
FIG. 12 is a flowchart illustrating the flow of a prize content lottery process performed by a server system according to the second embodiment.

FIG. 12 is a flowchart illustrating the flow of a prize content lottery process performed by the server system 1100 according to the second embodiment.

The flow of the prize content lottery process performed by the server system 1100 according to the second embodiment is basically the same as the flow of the prize content lottery process performed by the game device 1500 according to the first embodiment, except that the operation detection steps according to the first embodiment are replaced with reception of the operation input signal transmitted from the game device 1500. In the second embodiment, (1) when a given content list display request has been received from the game device 1500 (YES in step S7), (2) data necessary for displaying the total content list is transmitted (step S9), instead of performing the steps S6 and S8 according to the first embodiment.

When a lottery execution request has been received from the game device 1500 (YES in step S11), whether or not the prize content lottery execution prevention condition has been satisfied is determined (step S12) (the step S11 is performed instead of the step S10 according to the first embodiment).

When it has been determined that the prize content lottery execution prevention condition has been satisfied (YES in step S12), data necessary for the game device 1500 to perform the prize content lottery execution prevention notification process is transmitted to the game device 1500 (step S17) (the step S17 is performed instead of the step S16 according to the first embodiment). When it has been determined that the prize content lottery execution prevention condition has not been satisfied (NO in step S12), the prize content lottery process is performed (step S14).

When a main game start request has been received from the game device 1500 (YES in step S81), the step S84 is performed (the step S81 is performed instead of the step S80 according to the first embodiment). In the main gam control process according to the second embodiment, when updating the play data 530, replicated play data is transmitted to the server system 1100, as required. The server system 1100 stores the replicated play data as the replicated play data 530cp included in the user registration data 550 of the player. Note that the step S2 can be omitted when it is unnecessary to acquire the content list update data from an external server.

Figure 13:
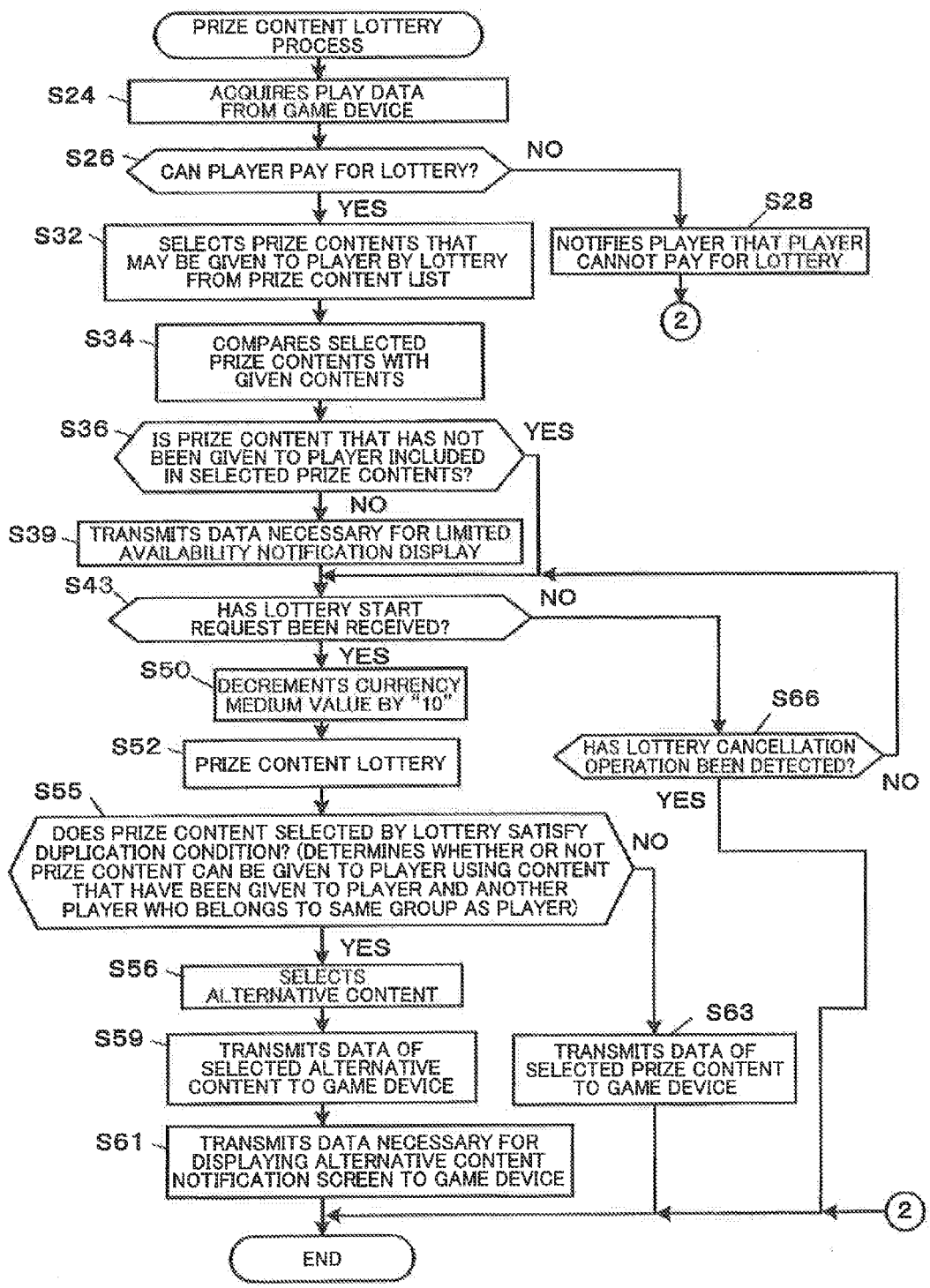
FIG. 13 is a flowchart illustrating the flow of a prize content lottery process performed by a server system according to the second embodiment.

FIG. 13 is a flowchart illustrating the flow of the prize content lottery process performed by the server system 1100 according to the second embodiment. The server processing section 200s of the server system 1100 acquires the play data 530 from the game device 1500 that has transmitted a lottery execution request (step S24). When the server processing section 200s has determined that the player can play a prize content lottery referring to the acquired play data 530 (YES in step S26), the server processing section 200s selects prize contents that satisfy the selection condition 513 from the prize contents registered in the prize content list 510 (step S32).

The server processing section 200s then compares the selected prize contents with the given content list 540 (step S34). When the server processing section 200s has determined that a prize content that has not been given to the player who operates the game device 1500 that has transmitted the lottery execution request is not included in the selected prize contents (NO in step S36), the server processing section 200s transmits data necessary for the game device 1500 to display the limited availability notification display 14 (step S39). The game device 1500 that has received the data displays the limited availability notification display 14, and stores the current date/time and the like as the limited availability notification history 539.

When the lottery execution request has been received from the game device 1500 (YES in step S43), the server processing section 200s causes the player to pay for a prize content lottery (step S50), executes a prize content lottery (step S52), and determines whether or not the prize content can be given to the player (step S55).

More specifically, the server processing section 200s refers to the given content list 540 from another player who belongs to the same group as the player, and determines whether or not the given contents registered in the acquired given content list 540 and the given contents registered in the given content list 540 of the player satisfy the duplication condition.

When the server processing section 200s has determined that the prize content cannot be given to the player, the server processing section 200s selects an alternative content in the same manner as in the step S58 according to the first embodiment (step S56), and transmits the data of the selected alternative content to the game device 1500 (step S59). Specifically, a content that has not been given to the other player who belongs to the same group as the player can be selected as the alternative content, and given to the player.

The server processing section 200s then transmits data necessary for the game device 1500 to display the alternative content notification screen W9 (step S61), and terminates the prize content lottery process. When the server processing section 200s has determined that the prize content can be given to the player, the server processing section 200s transmits the data of the prize content selected in the step S52 to the game device 1500 (step S63), and terminates the prize content lottery process.

The game device 1500 that has received the data of the alternative content or the prize content registers the received data in the given content list 540, and updates the cumulative lottery count 535 and the preceding lottery date/time 536.

Modifications

The embodiments to which the invention is applied have been described above. Note that the invention is not limited thereto. Various modifications may be appropriately made, such as adding other elements, omitting some of the elements, or changing some of the elements.

Although the above embodiments have been described taking an example in which the main game is an RPG, the main game may be another game or a social network service.

Although the second embodiment has been described taking an example in which the play data 530 is stored in the game device 1500, the server system 1100 may store and manage the play data 530. In this case, the flow of the prize content lottery process performed by the server system 1100 may be implemented by replacing the operation input detection step of the prize content lottery process according to the first embodiment (see FIGS. 8 and 9) with reception of a request based on an operation input from the game device 1500.

Although the above embodiments have been described taking an example in which the player must pay for a prize content lottery, it is also possible to employ a configuration in which the player need not pay for a prize content lottery (i.e., free lottery). In this case, the steps S26, S28, and S50 can be omitted (see FIG. 14).

It is also possible to allow the player to select a first prize content lottery that requires payment or a second prize content lottery that does not require payment (see FIG. 14) on the lottery screen W8. In this case, it is preferable to divide the alternative content list 520 into a list for the first prize content lottery and a list for the second prize content lottery, and set the content data 522 of the list for the first prize content lottery to be advantageous for the player as compared with the content data 522 of the list for the second prize content lottery.

When implementing a free lottery, a free lottery parameter (upper limit: "1") may be provided, and decremented by "1" when the player has played a free lottery instead of consuming the currency medium. For example, when the server increments the free lottery parameter of each player by "1" at midnight, each player can play a free lottery once a day.

The alternative content may be given to the player when a given time condition has been satisfied.

Figure 14:
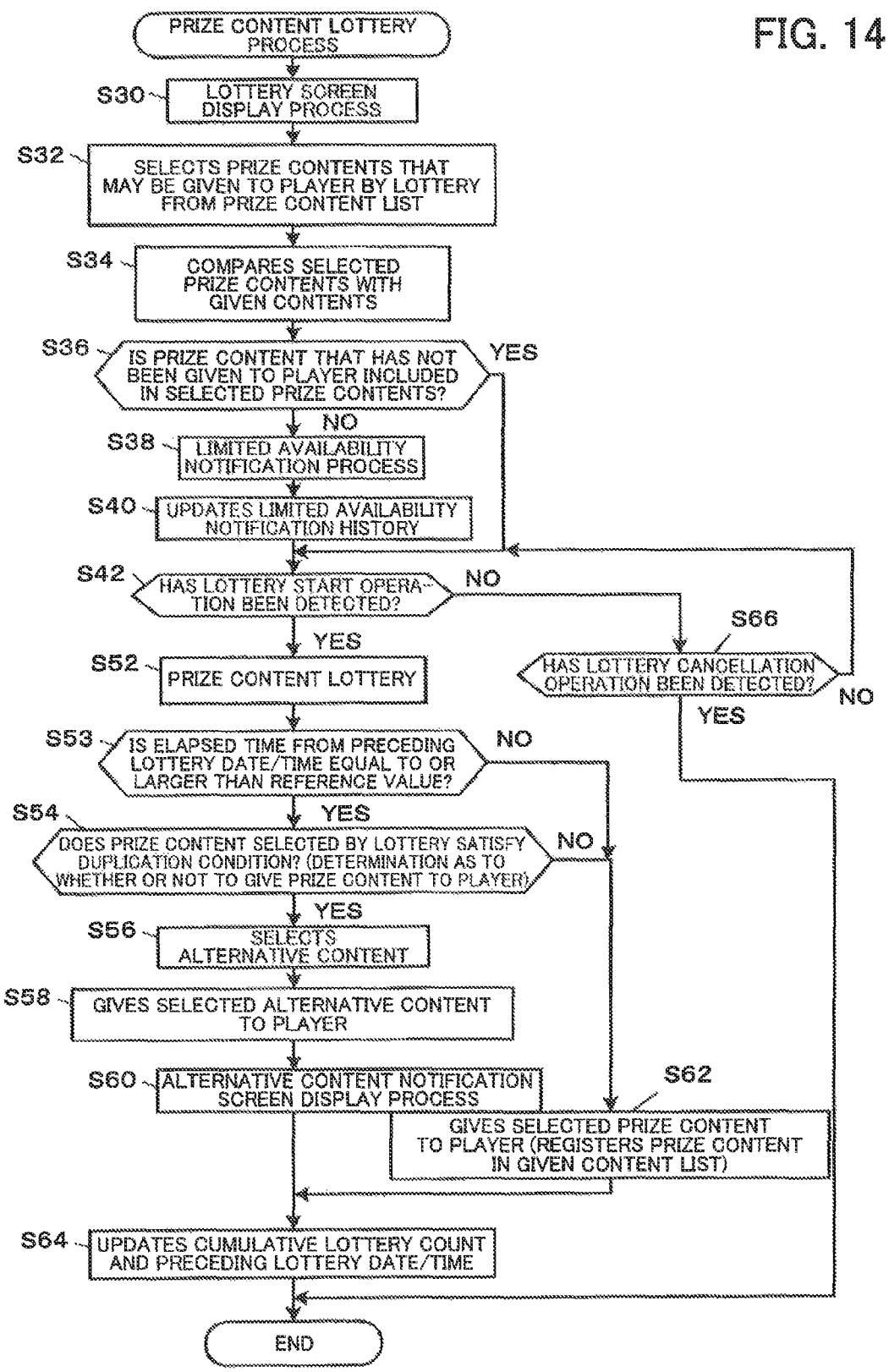
FIG. 14 is a flowchart illustrating the flow of a prize content lottery process according to a modification.

For example, when using the prize content lottery process according to the first embodiment, whether or not a prize content lottery satisfies the given time condition is determined after executing the prize content lottery (step S53) (see FIG. 14). More specifically, whether or not the elapsed time from the preceding lottery date/time 536 (see FIG. 4) to the current date/time at which a lottery execution operation has been detected is equal to or larger than a reference value (e.g., 24 hours) is determined. When it has been determined that the elapsed time is less than the reference value (NO in step S53), determination as to whether or not the prize content can be given to the player is skipped, and the prize content selected in the step S52 is given to the player (step S62). When it has been determined that the elapsed time is equal to or larger than the reference value (YES in step S53), whether or not the prize content can be given to the player is determined, and the alternative content is selected and given to the player based on the determination result, or the prize content selected in the step S52 is given to the player (steps S54 to S62).

The time condition used in the step S53 may be set appropriately (e.g., "10 days elapsed after play start date/time 533"). In this case, the alternative content is given to the player after 10 days has elapsed after the player has started the game, and is not given to the player before 10 days elapses after the player has started the game even if the duplication condition has been satisfied.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A computer-implemented method of controlling assignment of gaming elements in a video game using a lottery, the method comprising:
    offering, by at least one processor, the lottery to a player of the video game in exchange for an amount of a consumption parameter from the player;
    in response to the player providing the amount and accepting the offer for the lottery, randomly selecting, by at least one processor, a first gaming element from a plurality of selectable gaming elements;
    determining, by the at least one processor, whether or not to give the first gaming element to a player of the video game based on whether or not the first gaming element satisfies a gaming element duplication condition;
    in response to determining to give the first gaming element to the player, giving, by the at least one processor, the first gaming element to the player and accumulating the first gaming element within a set of possessed gaming elements possessed by the player in the video game; and
    in response to determining not to given the first gaming element to the player, giving, by the at least one processor, a second gaming element selected from the plurality of selectable gaming elements to the player, the second gaming element differing from the first gaming element, and wherein the player retains any previously given gaming elements as the set of possessed gaming elements.

2. The computer-implemented method of claim 1, further comprising:
    selecting, by the at least one processor, a third gaming element from the plurality of gaming elements based on a number of times that the gaming element duplication condition is satisfied, wherein the third gaming element is given to the player in place of the second gaming element.

3. The computer-implemented method of claim 1, further comprising:
    preventing, by the at least one processor, the random selection of the first gaming element in response to the player being unable to provide the amount of the consumption parameter.

4. The computer-implemented method of claim 3, wherein the second gaming element comprises a second amount of the consumption parameter.

5. The computer-implemented method of claim 4, further comprising:
    indicating, by the at least one processor within the video game, that the consumption parameter has reached an upper limit before the random selection of the first gaming element when the consumption parameter has reached the upper limit.

6. The computer-implemented method of claim 1, further comprising:
    indicating, by the at least one processor within the video game, that each of the plurality of selectable gaming elements are within the set of possessed gaming elements;
    receiving, by the at least one processor, from the player an operation that indicates whether or not to perform the lottery; and
    preventing, by the at least one processor, the random selection of the first gaming element in response to the operation indicating not to play the lottery.

7. The computer-implemented method of claim 1, wherein the second gaming element comprises an image.

8. The computer-implemented method of claim 1, wherein the second gaming element comprises a parameter value that can be utilized within the video game as a game parameter value.

9. The computer-implemented method of claim 1, further comprising:

giving, by the at least one processor, the first gaming element within a first period which is outside a pre-set period; and giving, by the at least one processor, the second gaming element based on whether or not the gaming element duplication condition is satisfied within the pre-set period.

10. The computer-implemented method of claim 1, further comprising:

detecting, by the at least one processor, a no-option-left situation in which each of the plurality of selectable gaming elements are within the set of possessed gaming elements;

in response to detecting the no-option-left situation, notifying, by the at least one processor, the player that (i) the player cannot get another gaming element from acceptance of the lottery and (i) accepting the offer for the lottery may result in disadvantages caused to the player within the video game; and in response to not detecting the no-option-left situation, allowing the random selection of the first gaming element based on acceptance of the offered lottery.

11. A non-transitory computer-readable storage medium storing instructions thereon, which when executed by at least one processor, cause the at least one processor to control assignment of game elements in a video using a lottery by:

offering the lottery to a player of the video game in exchange for an amount of a consumption parameter from the player;

in response to the player providing the amount and accepting the offer for the lottery, randomly selecting a first gaming element from a plurality of selectable gaming elements;

determining whether or not to give the first gaming element to a player of the video game based on whether or not the first gaming element satisfies a gaming element duplication condition;

in response to determining to give the first gaming element to the player, giving the first gaming element to the player and accumulating the first gaming element within a set of possessed gaming elements possessed by the player in the video game; and in response to determining not to given the first gaming element to the player, giving a second gaming element selected from the plurality of selectable gaming elements to the player, the second gaming element differing from the first gaming element, and wherein the player retains any previously given gaming elements as the set of possessed gaming elements.

12. A gaming device comprising:

a non-transitory computer-readable storage device configured to store a plurality of processor-executable instructions thereon;

at least one processor, the at least one processor coupled to the non-transitory computer-readable storage device and configured to execute the plurality of processor-executable instructions to perform a process of controlling assignment of gaming elements in a video game using a lottery, the process comprising:

offering the lottery to a player of the video game in exchange for an amount of a consumption parameter from the player;

in response to the player providing the amount and accepting the offer for the lottery, randomly selecting a first gaming element from a plurality of selectable gaming elements;

determining whether or not to give the first gaming element to a player of the video game based on whether or not the first gaming element satisfies a gaming element duplication condition;

in response to determining to give the first gaming element to the player, giving the first gaming element to the player and accumulating the first gaming element within a set of possessed gaming elements possessed by the player in the video game; and in response to determining not to given the first gaming element to the player, giving a second gaming element selected from the plurality of selectable gaming elements to the player, the second gaming element differing from the first gaming element, and wherein the player retains any previously given gaming elements as the set of possessed gaming elements.

13. A game server system configured to control assignment of game elements in a video using a lottery, the game server system comprising:

a non-transitory computer-readable storage device configured to store a plurality of processor-executable instructions thereon;

at least one processor, the at least one processor coupled to the non-transitory computer-readable storage device and configured to execute the plurality of processor-executable instructions to perform a process comprising:

transmitting, to a player terminal, an offer for the lottery to the player of the video game in exchange for an amount of a consumption parameter from the player;

in response to the player providing the amount and accepting the offer for the lottery, randomly selecting a first gaming element from a plurality of selectable gaming elements;

determining whether or not to give the first gaming element to a player of the video game based on whether or not the first gaming element satisfies a gaming element duplication condition;

in response to determining to give the first gaming element to the player, transmitting, to the player terminal, data indicative of the first gaming element to the player and accumulating the first gaming element within a set of possessed gaming elements possessed by the player in the video game; and in response to determining not to given the first gaming element to the player, transmitting, to the player terminal, data indicative of a second gaming element selected from the plurality of selectable gaming elements to the player, the second gaming element differing from the first gaming element, and wherein the player retains any previously given gaming elements as the set of possessed gaming elements.

14. The game server system of claim 13, wherein the processor is further configured to execute the plurality of processor-executable instructions to cause the processor to:

manage linking between a group and a player who belong to the group, wherein the second gaming element selected from the plurality of selectable gaming elements is a gaming element that has not been given to another player who belongs to the same group as the player, in response to determining not to given the first gaming element to the player.

15. The game server system of claim 13, wherein the processor is further configured to execute the plurality of processor-executable instructions to cause the processor to:

detect a no-option-left situation in which each of the plurality of selectable gaming elements are within the set of possessed gaming elements;

in response to detecting the no-option-left situation, notifying the player that (i) the player cannot get another gaming element from acceptance of the lottery and (i) accepting the offer for the lottery may result in disadvantages caused to the player within the video game; and in response to not detecting the no-option-left situation, allowing the random selection of the first gaming element based on acceptance of the offered lottery.

16. A game server system configured to control assignment of game elements in a video using a lottery, the game server system comprising:

a non-transitory computer-readable storage device configured to store a plurality of processor-executable instructions thereon;

at least one processor, the at least one processor coupled to the non-transitory computer-readable storage device and configured to execute the plurality of processor-executable instructions to perform a process comprising:

managing linking between a group and a player who belongs to the group;

transmitting, to a player terminal, an offer for the lottery to the player of the video game in exchange for an amount of a consumption parameter from the player;

in response to the player providing the amount and accepting the offer for the lottery, randomly selecting a first gaming element from a plurality of selectable gaming elements;

determining whether or not to give the first gaming element to the player of the video game based on whether or not the first gaming element satisfies a gaming element duplication condition;

in response to determining to give the first gaming element to the player, transmitting, to the player terminal, data indicative of the first gaming element to the player and accumulating the first gaming element within a set of possessed gaming elements possessed by the player in the video game; and in response to determining not to given the first gaming element to the player, transmitting, to the player terminal, data indicative of a second gaming element selected from the plurality of selectable gaming elements to the player, the second gaming element differing from the first gaming element, and wherein the player retains any previously given gaming elements as the set of possessed gaming elements.

17. The game server system of claim 16, wherein the processor is further configured to execute the plurality of processor-executable instructions to cause the processor to:

detect a no-option-left situation in which each of the plurality of selectable gaming elements are within the set of possessed gaming elements;

in response to detecting the no-option-left situation, notifying the player that (i) the player cannot get another gaming element from acceptance of the lottery and (i) accepting the offer for the lottery may result in disadvantages caused to the player within the video game; and in response to not detecting the no-option-left situation, allowing the random selection of the first gaming element based on acceptance of the offered lottery.

* * * * *